(12) United States Patent
Trehan

(10) Patent No.: US 12,240,554 B2
(45) Date of Patent: *Mar. 4, 2025

(54) APPLICATION SERVER FOR MANAGING ELECTRIC BIKES USING ARTIFICIAL INTELLIGENCE AND METHOD THEREOF

(71) Applicant: Rajiv Trehan, Bangkok (TH)

(72) Inventor: Rajiv Trehan, Bangkok (TH)

(73) Assignee: Rajiv Trehan, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,039

(22) Filed: Jan. 25, 2024

(65) Prior Publication Data

US 2024/0158040 A1 May 16, 2024

Related U.S. Application Data

(63) Continuation of application No. 17/501,674, filed on Oct. 14, 2021, now Pat. No. 11,912,369.

(51) Int. Cl.
*G06V 20/58* (2022.01)
*B60W 30/10* (2006.01)
*B62J 43/16* (2020.01)
*G06F 18/214* (2023.01)

(52) U.S. Cl.
CPC .............. *B62J 43/16* (2020.02); *B60W 30/10* (2013.01); *G06F 18/214* (2023.01); *G06V 20/58* (2022.01); *B60W 2300/36* (2013.01); *B60W 2420/403* (2013.01)

(58) Field of Classification Search
CPC .......... B62J 45/20; B62J 50/225; B62J 43/16; B62M 6/45; B62M 6/50; B60R 2325/205; B60W 2420/42; B60W 30/10; B60W 2300/36; G06F 18/214
See application file for complete search history.

(56) References Cited

U.S. PATENT DOCUMENTS

| 2019/0178679 A1* | 6/2019 | Woolley | G01C 21/3655 |
| 2022/0176829 A1* | 6/2022 | Haugen | B60L 3/106 |
| 2022/0210650 A1* | 6/2022 | Ericksen | H04W 4/80 |
| 2022/0311468 A1* | 9/2022 | Stephens | H04W 4/80 |

* cited by examiner

*Primary Examiner* — Kenneth J Malkowski
(74) *Attorney, Agent, or Firm* — Kendal M. Sheets

(57) ABSTRACT

An application server for managing electric bikes using Artificial Intelligence (AI) is disclosed. For each of a plurality of electric bikes, the application server is configured to process user information associated with a user using an electric bike from the plurality of electric bikes, sensor information associated with the electric bike, and path information associated with a path being used to ride the electric bike. The application server is further configured to determine whether information states of at least one of the user information, the sensor information, or the path information are deviating from associated predefined thresholds. In response to determining at least one deviation, the application server is configured to generate, an alert signal and transmit a deactivating signal to the at least one electric bike to progressively curtail at least one functioning of the at least one electric bike in response to determining at least one deviation.

12 Claims, 25 Drawing Sheets

| ID: | Color Code | GPS | Objects | Trip ID: | Source Device: | Source Device Meta: | Created at: | |
|---|---|---|---|---|---|---|---|---|
| Enter ID | Color Code | {"lat":"0","long":"0"} | ["CAR","Bike"] | Enter Trip Id | Enter Source Device | Enter Source Device Meta | Enter Date | OK |
| 25576 | ☐ Danger | 12.46309, 99.97424 | | 1758945684 | samsung SM-A406FN | 0.0.19 (19) | 6/24/2021, 5:47:11 PM | |
| 25575 | ☐ Danger | 12.46309, 99.97424 | PERSON | 1758945684 | samsung SM-A406FN | 0.0.19 (19) | 6/24/2021, 5:47:10 PM | |
| 25574 | ○ Safe | 12.46309, 99.97424 | | 1758945684 | samsung SM-A406FN | 0.0.19 (19) | 6/24/2021, 5:47:09 PM | |
| 25573 | ☐ Danger | 12.46309, 99.97424 | PERSON, CAR | 1758945684 | samsung SM-A406FN | 0.0.19 (19) | 6/24/2021, 5:47:08 PM | |
| 25572 | ☐ Danger | 12.46309, 99.97424 | PERSON, PERSON | 1758945684 | samsung SM-A406FN | 0.0.19 (19) | 6/24/2021, 5:47:07 PM | |
| 25571 | ☐ Danger | 12.46309, 99.97424 | PERSON | 1758945684 | samsung SM-A406FN | 0.0.19 (19) | 6/24/2021, 5:47:06 PM | |
| 25570 | ☐ Danger | 12.46309, 99.97424 | PERSON, PERSON | 1758945684 | samsung SM-A406FN | 0.0.19 (19) | 6/24/2021, 5:47:05 PM | |
| 25569 | ☐ Danger | 12.46309, 99.97424 | PERSON, PERSON, PERSON | 1758945684 | samsung SM-A406FN | 0.0.19 (19) | 6/24/2021, 5:47:04 PM | |
| 25568 | ☐ Danger | 12.46309, 99.97424 | PERSON, PERSON | 1758945684 | samsung SM-A406FN | 0.0.19 (19) | 6/24/2021, 5:47:03 PM | |
| 25567 | ☐ Danger | 12.46309, 99.97424 | PERSON, PERSON | 1758945684 | samsung SM-A406FN | 0.0.19 (19) | 6/24/2021, 5:47:02 PM | |
| 25566 | ☐ Danger | 12.46309, 99.97424 | PERSON | 1758945684 | samsung SM-A406FN | 0.0.19 (19) | 6/24/2021, 5:47:59 PM | |
| 25565 | ☐ Danger | 12.46309, 99.97424 | PERSON | 1758945684 | samsung SM-A406FN | 0.0.19 (19) | 6/24/2021, 5:47:56 PM | |

APPLICATION SERVER FOR MANAGING ELECTRIC BIKES USING ARTIFICIAL INTELLIGENCE AND METHOD THEREOF

CROSS-REFERENCE TO RELATED APPLICATION

This application is a Continuation of U.S. patent application Ser. No. 17/501,674, filed on Oct. 14, 2021, entitled "SYSTEM AND METHOD FOR MANAGING SAFETY AND COMPLIANCE FOR ELECTRIC BIKES USING ARTIFICIAL INTELLIGENCE (AI)," which is hereby incorporated by reference in its entirety.

DESCRIPTION

Technical Field

This disclosure relates generally to electric bikes, and more particularly to system and method for managing safety and compliance for electric bikes using Artificial Intelligence (AI).

Background

As electric vehicles have become more powerful and affordable, electric bikes and electric scooters have become increasingly practical alternatives to traditional transportation methods for many people, especially for those in crowded cities. Though electric bikes are easy to operate and are convenient to use, they don't give a sense of confidence and safety to a user, especially on busy city roads. The main reason is that conventional electric bikes lack provision of smart assistance, guidance, and/or controls. Moreover, some users who feel safe and comfortable using electric bikes mostly end up misusing them by not adhering to traffic rules or other laws/rules prevalent and applicable in a given state or country. Such users thereby end-up making electric bikes a nuisance.

SUMMARY

In an embodiment, an electric bike controlled using Artificial Intelligence (AI) is disclosed. The electric bike may include a motor and a rechargeable battery coupled to the motor. The rechargeable battery may be configured to power the motor. The electric bike may further include a controller that is communicatively coupled to the motor and the rechargeable battery. The electric bike may include a mobile mount that is configured to receive a mobile device and communicatively couple the mobile device to the controller in response to the mobile device being received by the mobile mount. The mobile device upon being communicatively coupled to the controller may be configured to capture user information associated with a user using the electric bike, via a front camera of the mobile device. Further, the mobile device may be configured to capture sensor information associated with the electric bike via one or more sensors configured in the mobile device and the electric bike. The mobile device may, via a rear camera of the mobile device, may be configured to capture path information associated with a path being used to ride the electric bike. Using a first mobile application being executed on the mobile device, the mobile device may be configured to convert each of the user information, the sensor information, and the path information into corresponding information states. Further, the mobile device may use the first mobile application to determine whether information stated determine for the user information, the sensor information, or the path information are deviating from associated predefined thresholds. In response to determining at least one deviation, the mobile device may generate an alert signal, via a display of the mobile device, on a Graphical User Interface (GUI). In response to determining at least one deviation, the mobile device, via the controller, may transmit a deactivating signal to the controller of the electric bike to progressively curtail at least one functioning of the electric bike.

In another embodiment, an electric bike that is controlled using AI is disclosed. The electric bike may include a front camera mounted on a steering handle of the electric bike, a rear camera mounted on the steering handle, a display screen mounted on the steering handle, a motor, one or more sensors configured within the electric bike, a rechargeable battery coupled to the motor. The rechargeable battery may be configured to power the motor. In addition, the electric bike may include a controller communicatively coupled to the front camera, the rear camera, the display screen, the one or more sensors, the motor and the rechargeable battery. The controller may be configured to capture, via the front camera, user information associated with a user using the electric bike. The controller may further be configured to capture, via the one or more sensors, sensor information associated with the electric bike and capture, via the rear camera, path information associated with a path being used to ride the electric bike. The controller may convert each of the user information, the sensor information, and the path information into corresponding information states. Further, the controller may determine whether information states determined for the user information, the sensor information, or the path information are deviating from associated predefined thresholds. The controller may further generate an alert signal, via the display screen operatively configured to the controller, on a GUI in response to determining at least one deviation. Further, the controller may generate a deactivating signal to progressively curtail at least one functioning of the electric bike in response to determining at least one deviation.

In yet another embodiment, a system for controlling an electric bike using AI is disclosed. The system may comprise of a processor and a memory communicatively coupled to the processor. The memory may comprise processor instructions, which when executed by the processor cause the processor to receive user information associated with a user using the electric bike, wherein the user information is captured using a front camera of a mobile device. The system may receive sensor information associated with the electric bike via one or more sensors configured in the mobile device and the electric bike. Further, the system may receive via a rear camera of the mobile device, path information associated with a path being used to ride the electric bike. The system may convert each of the user information, the sensor information, and the path information into corresponding information states. The system may determine whether information states determined for the user information, the sensor information, or the path information are deviating from associated predefined thresholds. Further, the system may generate an alert signal in response to determining at least one deviation and may transmit a deactivating signal to progressively curtail at least one functioning of the electric bike in response to determining at least one deviation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 17A to 17D illustrate admin GUIs that are displayed to an administrator, in accordance with some exemplary embodiments.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
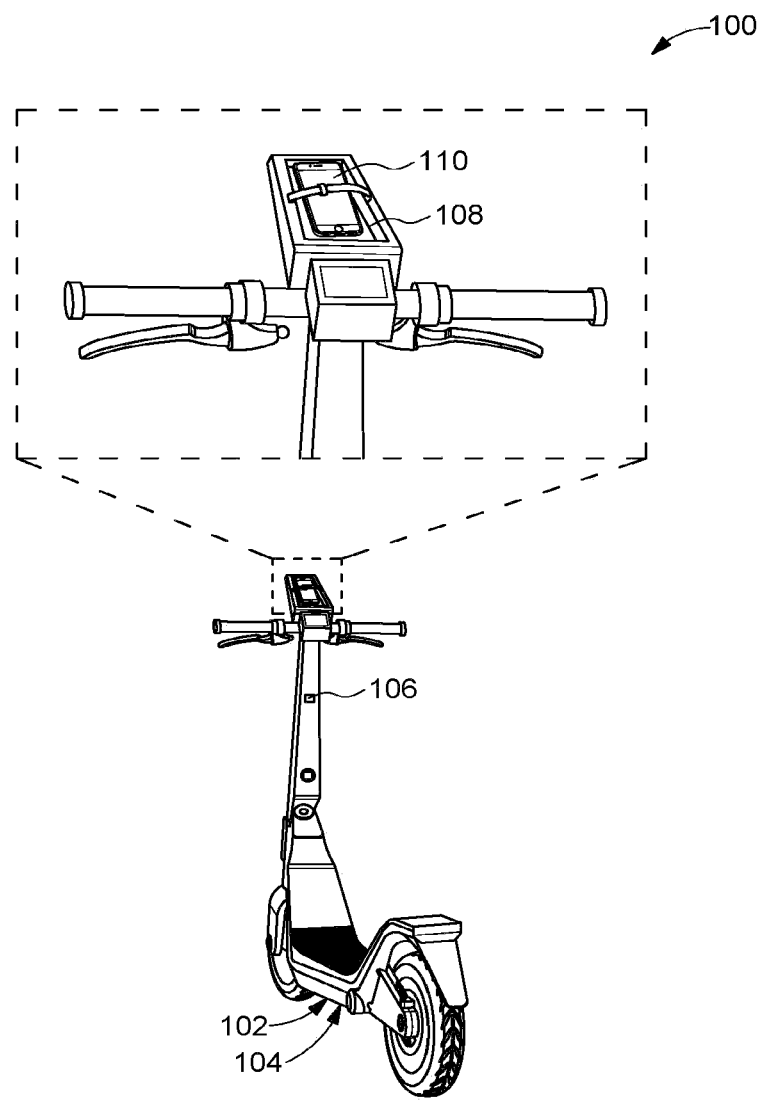
FIG. 1 illustrates an electric bike controlled using Artificial Intelligence (AI), in accordance with some exemplary embodiments.

Referring now to FIG. 1, an electric bike 100 controlled using Artificial Intelligence (AI) is illustrated, in accordance with some exemplary embodiments. The electric bike 100 may be provided by a rental service provider or may be owned by a user. The electric bike 100 may include a motor 102 and a rechargeable battery 104 that is coupled to the motor 102. The motor 102 may, for example, be a Direct Current (DC) motor, a brushless DC motor, a sensor less brushless motor, Permanent Magnet Synchronous Motor (PMSM), Three Phase Alternating Current (AC) Induction Motors, Switched Reluctance Motors (SRM), and the like. The rechargeable battery 104 may, for example, be a lithium-ion (li-ion) battery, a lead-acid battery, nickel-metal hydride battery, ultracapacitors, and so forth. The rechargeable battery 104 may be configured to power the motor 102. It will be apparent to a person skilled in the art that the position or placement of the motor 102 and the rechargeable battery 104 is merely indicative and the motor 102 and the rechargeable battery 104 may be placed at a different location within the electric bike 100.

The electric bike 100 may further include a controller 106 that may be communicatively coupled to the motor 102 and the rechargeable battery 104. It will be apparent to a person skilled in the art that the position or placement of the controller 106 is merely indicative and it may be placed at a different location within the electric bike 100. The controller 106 may communicate with the motor 102 and the rechargeable battery 104 via a wired or a wireless connection and may be programmed to execute various memory stored instructions. The controller 106 may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both. The controller 106 may execute one or more software or firmware programs or routines, combinational logic circuit(s) and input/output circuit(s), and include appropriate signal conditioning and buffer circuitry, and other components to provide described functionality. Further, the electric bike 100 may include additional components (not shown in FIG. 1), for example, gear hubs, electrically controlled derailleurs, suspension devices, lights, sensors such as wheel speed sensors, cadence sensors, inclination sensors, direction sensors, altitude sensors, pressure sensors, a gyroscope, a motion sensor, GPS sensors, multi-axial accelerometers, height sensors, tilt sensors, and other similar sensors.

The electric bike 100 may also include a mobile mount 108 and may be configured to receive a mobile device 110. The mobile mount 108, for example, may have transparent surface on which the mobile device 110 may be placed. It may be noted that the mobile mount 108 is not limited to the depiction in FIG. 1 and may have other shapes and configurations. In one configuration, the mobile mount 108 may be fixed to the electric bike 100. In other configurations, the mobile mount 108 may be easily installed onto handles or steering handles of the electric bike 100 without use of brackets or any other attaching means. The mobile mount 108 may be designed to keep the mobile device 110 steady and tight in order to ensure that the mobile device 110 does not fall off while the electric bike 100 is moving. Further, the mobile mount 108 may be configured with rotating head that may rotate at least by 90-degrees in horizontal and vertical directions in order to provide a comfortable view of the mobile device 110 to the user while riding the electric bike 100. The mobile device 110 may be a mobile phone or a portable tablet. Further, when the mobile device 110 is received by the mobile mount 108, the mobile mount 108 may be configured to couple the mobile device 110 to the controller 106 via a communication port (for example, a USB port) provided within the mobile mount 108. Alternatively, the mobile device 110 may directly couple with the controller 106 via a wireless connection. Once coupled, the controller 106 may receive a set of instructions from the mobile device 110 to perform a set of operations as instructed by the user.

The mobile device 110 may include, but is not limited to a front camera, a rear camera, and sensors. Examples of the sensors may include, but are not limited to a temperature sensor, a gyroscope, a motion sensor, a pressure sensor, GPS sensors, multi-axial accelerometers, height sensors, tilt sensors, position sensors, proximity sensors, and other similar sensors. The mobile device 110 may use the front camera to capture user information of a user using the electric bike 100. The front camera may capture images of head, face, and eyes of the user riding the electric bike 100. The mobile device 110 may capture sensor information associated with the electric bike 100 using the sensors present in each of the electric bike 100 and the mobile device 110.

Further, a rear camera of the mobile device 110 may be used to capture path information. The path information may be related to a path on which the electric bike is ridden by the user. The path information may include at least one of, but is not limited to lane location, pedestrian location, traffic lights, obstacle location, nearby vehicle location, deviations in the path, or surface data of the path. A mobile application may be installed and configured on the mobile device 110. The mobile application may convert each of the user information, the sensor information, and the path information into corresponding information states. In some embodiment, these information states may be numerical values. Additionally, the mobile application may determine whether the determined information states of at least one of the user information, the sensor information, or the path information are deviating from associated predefined thresholds. When the information states are numerical values, the associated predefined thresholds may also be numerical values. In some embodiments, the associated predefined thresholds may be determined by an Artificial Intelligence (AI) model. The AI model may be trained to determine thresholds based on at least one of a training set of user information, a training set of sensors information, and a training set of path information. In other words, thresholds determined by the AI model may not be fixed and may vary based on various factors as captured by way of the user information, the sensor information, and the path information. The associated predefined thresholds may correspond to a set of compliance rules that includes, for example, traffic rules (for example, licensed aged to use electric bikes), safety rules, or administration defined rules. In addition, the associated predefined thresholds may be jurisdiction specific pertaining to a location where the electric bike 100 is used. Thus, the associated predefined thresholds as discussed above may keep on changing as the location of the electric bike 100 changes. By way of an example, based on state laws, the speed limit for riding an electric bike or scooter may vary from state to state.

When the user is riding the electric bike 100 and a deviation from one or more of the associated predefined thresholds is determined, an alert signal may be generated on a Graphical User Interface (GUI) via a display of the mobile device 110. The GUI may thus be used to indicate to the user that he/she is breaking one or more compliance rules. The alert signal may be in the form or a warning to the user. Additionally, or alternatively, upon determining the deviation, a deactivating signal may be transmitted to the controller 106 of the electric bike 100 to progressively curtail at least one functioning of the electric bike 100. The deactivating signal, for example, may be converting the electric bike operation to manual biking, limiting riding speed, limit generation of options related to route information, and other similar restrictions or limitations. By way of an example, maximum speed (one of the various functions) of the vehicle, may be progressively reduced as and when subsequent deviations occur.

By way of an example of the whole process of renting and then using the electric bike 100 while adhering to the compliance rules, a user may initiate booking of the electric bike 100. The user may rent the electric bike 100 from a rental service provider (or the user may even own the electric bike 100). The user may rent the electric bike 100 using the mobile application configured on the mobile device 110. To this end, using the mobile application, multiple available electric bikes provided by the rental service provider may be located in the vicinity of the user. Further, by scanning a QR code from within the mobile application, the electric bike 100 may be unlocked for use. Additionally or alternatively, an alphanumeric password, pattern based passwords, biometric data (for example, retina scan, fingerprint, facial recognition), One time Password (OTP), may be used for unlocking the electric bike 100. Further, details related to charges incurred for unlocking and for future use of the electric bike 100 may be displayed and provided via the mobile application. Before initiating the ride, the user A may place the mobile device 110 onto the mobile mount 108 of the electric bike 100.

In order to determine deviations based on the user information, when the user initiates riding of the electric bike 100, the front camera of the mobile device 110 may capture images of head, face and eyes of the user for determining the user information. The images related to the head, the face, and the eyes of the use may be recorded iteratively after expiry of predefined time intervals (for example, every 0.5 seconds) to detect whether the user is paying attention on road while driving the electric bike 100 may be performed. Further, by determining head position, facial expressions and eye movements of the user, a determination may be made to ensure that the user is attentive enough to prevent collisions with objects present on the path while riding the electric bike 100. Moreover, images related to the head and the face (and other body parts) of the user may also be used to determine whether the user is currently wearing a helmet or other safety gear that may be deemed necessary to ride the electric bike 100. Additionally, age of the user may also be determined using an AI based application. The determined age may then be used to ensure whether the user's age satisfies the minimum age criteria.

The images of the head of the user may be processed via one or more image processing techniques to determine whether an orientation of the head is in a normal range or not. The normal range, for example, may include rotation of the head up to 45 degrees to left and 45 degrees to right relative to the position of the front camera. Further, one or more image processing techniques may be employed to identify a position of the eyes relative to orientation of the head. In addition, when the orientation of the head is in the normal range, it may further be checked whether the eyes of the user are in a closed state for a prolonged duration, for example, a duration of time exceeding a predefined time period, for example, two seconds. In some embodiments, when processing of the images of the user's facial expressions depict that the user is yawing repeatedly and excessively, it may be determined that the user may be physically exhausted, may be experiencing sleepiness, may be drunk, or may be feeling drowsy. In some other embodiment, when processing of the images of the user's facial expressions (captured via an infrared or thermal camera) depict that the user has high fever, it may be determined that the user is sick and thus not fit to ride the electric bike 100. User's temperature may also be captured by a temperature sensor installed in the electric bike 100 or on the mobile device 110. In yet some other embodiments, when processing of user's audio (captured via a microphone of the electric bike 100 or the mobile device 110) depict that the user has cold or cough, it may be determined that the user may be suffering from a transmittable disease and thus is not fit to ride the electric bike 100. This may help in controlling spread of any disease or sickness as a result of sharing the electric bike 100 between multiple users.

Based on processing of the captured images, when it is determined that an action of the user (determined from the user information) is in violation of one of a set of compliance rules, an alert signal may be generated in the form of a warning to the user (via the mobile device 110). The alert signal, for example, may be an audio-visual alert or a vibration alert on the mobile device 110. The visual alert, for example, may be displaying a predefined element (from a plurality of predefined elements) on the screen of the mobile device 110. The plurality of predefined elements may include colors, logos, patterns, images, themes, screen savers, or other similar information. It may be noted that one or more of the plurality of predefined elements may be user defined. Subsequently or alternatively, a deactivating signal may be transmitted to progressively curtail one or more functions of the electric bike 100. By way of an example, a pedal or clutch used for providing acceleration to the electric bike 100 may be gradually disabled to varying degrees based on violating actions of the user, such that, the user is not able to increase the speed of the electric bike 100 beyond a certain limit. By way of another example, the electric bike 100 may be completely halted, if it is determined that the user is drunk, sleepy, or sick.

In order to determine deviations based on the sensor information, multiple sensors configured within the electric bike 100 and the mobile device 110 may first detect state and speed of the electric bike 100, inclination in the electric bike 100, overheating, creaking sounds, breaking sounds, remaining battery, location of the electric bike 100, and other similar information. The sensor information may then be compared with associated thresholds in order to determine deviations. By way of an example, a GPS sensor positioned inside the electric bike 100 or sensors/devices external to the electric bike 100 may collect information regarding route choice of the user and may determine whether the user is following a planned route or not. If the user is deviating from the planned route, an alert may be generated and displayed to the user via the mobile device 110. The route choice information may further be used to classify a type of trip (for example, commute, errand, a new route, or other similar categorization). By way of another example, it may be determined that certain parts of the electric bike 100 are overheating because of prolonged use or any other mechanical or electrical issue. In such case, an alert may be generated and displayed to the user via the mobile device 110. By way of yet another example, it may be determined that the battery of the electric bike 100 is about to drain. In such case, an alert may be generated and displayed to the user via the mobile device 110. The user may further be indicated that the battery would need to be immediately recharged and also the remaining amount of distance that the electric bike 100 would be able to cover without getting charged.

In order to determine deviations based on the path information and in continuation of the above example, the rear camera of the mobile device 110 may be used to capture the path information associated with a path being used to ride the electric bike 100. The path information may be used to determine lane location, and other vehicle's position or location data, deviations in the path, surface data of the path, traffic lights on the path, other nearby vehicles, traffic levels, road conditions, traffic obstructions, presence of obstructions such as animals, additional bikers or cyclists, pedestrians, or other similar information. Surface data of the path may include, but are not limited to condition of the path, potholes, speed breakers, water logging, debris, or other similar surface data. It may be noted that the path information as captured may also be automatically recorded and shared with one or more servers and other nearby electric bikes or other vehicles. The electric bike 100 may use V2X communication interface (i.e., Vehicle to Vehicle (V2V) and/or Vehicle to Infrastructure (V2I)) to share this information with nearby vehicles. This information, for example, may also be shared with public authorities so that quick action can be taken to correct or resolve these issues, for example, filling up of potholes, removal of debris, or drainage of water from water logged areas.

When based on the path information it is determined that there is a deviation from associated thresholds, the alert signals may be generated and displayed as a predefined element to the user on the GUI of the mobile device 110. The predefined element, for example, may be a predefined color. The predefined element may also include logos, patterns, images, themes, screen savers, or other similar information. By way of an example, when a vehicle is present on the same path as that of the electric bike 100 and is at a distant location with respect to the electric bike 100, the alert signal may be generated by displaying green colour on at least a portion of the screen or the entire screen of the mobile device 110 via the GUI of the mobile application. However, when the relative distance of the vehicle is greater than but close to a predefined distance threshold, the alert signal may be generated by displaying the orange colour (or any other warning color) on at least a portion of the screen or on the entire screen of the mobile device 110 via the GUI of the mobile application. In contrast, when the relative distance of the vehicle is less than the predefined distance threshold, the alert signal may be generated by displaying red colour (or any other warning color) on at least a portion of the screen or on the entire screen of the mobile device 110 via the GUI of the mobile application. As a result, the user may be timely alerted of the complexity of the situation to avoid a potential collision with obstacles.

In some embodiments, when the electric bike 100 is moving, execution of one or more mobile applications on the mobile device other than the mobile application that is linked with the electric bike 100 may be blocked by the mobile application itself. Thus, this blocking of the execution of one or more mobile applications is forced and not a voluntary decision by the user. In other words, in order to get access the electric bike 100, the execution of one or more mobile applications is blocked. By way of an example, when the electric bike 100 is moving, execution of applications other than the mobile application that is providing information related to upcoming route, path conditions, obstacle related information and the like, may be halted for further execution and use. The other applications, for example, may be music apps, content streaming apps, health related apps, education related apps, and other similar apps. Additionally, when the first mobile application is not running on the mobile device 110 of the user, user access to the electric bike 100 may be blocked.

Figure 2:
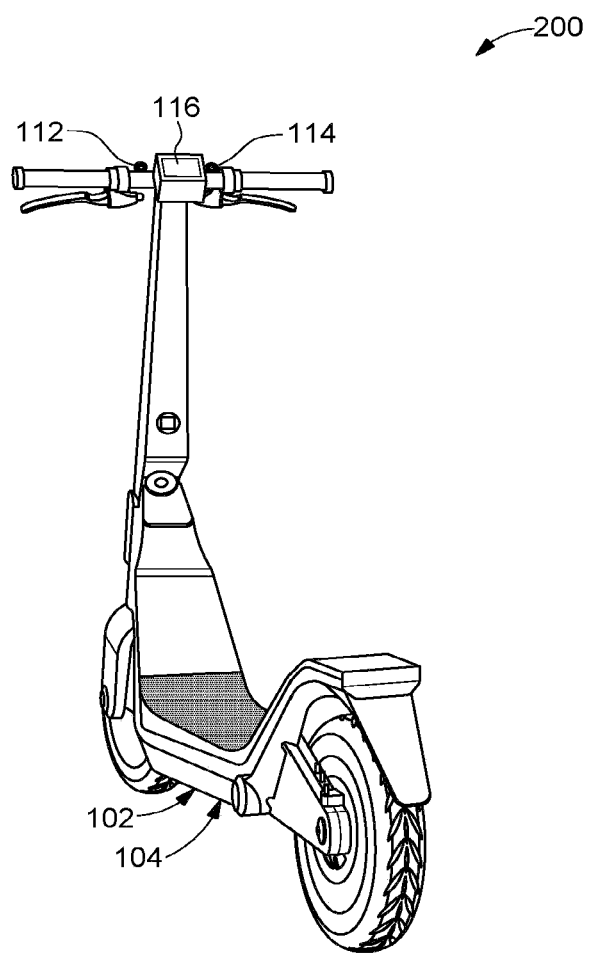
FIG. 2 illustrates an electric bike controlled using AI, in accordance with some other exemplary embodiments.

Referring now to FIG. 2, an electric bike 200 is depicted in accordance with another exemplary embodiment. In this embodiments, the electric bike 200 may include a front camera 112, a rear camera 114, and a display screen 116. The front camera 112, the rear camera 114, and the display screen 116 may be mounted on a steering handle of the electric bike 100. In this embodiment, the electric bike 200 (unlike the electric bike 100) does not include the mobile mount 108 that is configured to receive the mobile device 110. Instead, the display screen 116 is integrated within the electric bike 200 and is configured to display the mobile application, which in this case is stored on a memory (not shown in FIG. 2) within the electric bike 200 and is also configured to communicate with the controller 106.

The electric bikes 100 and 200 (i.e., irrespective of the configuration) may also be configured to communicatively couple with a server or a service (not shown in FIGS. 1 and 2) via a communication network. Additionally or alternatively, the mobile application configured on the mobile device 110 may also communicate with the server via the communication network. The server, for example, may be a central server, a cloud server, or a distributed server (to enable load balancing and data security). The server may also be replaced by a distributed ledger network (for example, Blockchain). The server may thus be able to receive information related to performance and health of the electric bike 100. Additionally the server may be able to receive user related information in order to maintain a record of users who have used the electric bike 100 and the manner in which each of them has handled the electric bike 100. The records may be maintained in order to create usage performance reports (number of violations etc.), user compliance and safety reports, user preferences, loyalty points, karma points (derived based on usage performance reports and user compliance and safety reports), number of snags or issues encountered in the electric bike 100, usage duration of the electric bike 100, usage pattern of the electric bike 100, location where the electric bike 100 is currently parked, and other similar information. The loyalty and karma points, for example, may be used to provide various offers and discounts to a user, for example, free rides. By way of an example, the user may select an electric bike for a given range. For a short distance ride, the number of available electric bikes with sufficient charge may be more, while for a long distance ride, the number of available electric bikes with sufficient charge may be limited. In such cases, a normal user may have to hire one electric bike to reach their destination and a another one to return back. However, users with higher loyalty and/or karma points may be given preference to hire electric bikes with higher charge, such that, they need to hire a single electric bike for the entire round trip.

In some embodiments, the server may also broadcast status information related to the electric bike 100 directly to the electric bike 100, which may then be displayed via the display screen 116, or to the mobile device 110 via the mobile application linked with the electric bike 100. The status information, for example, may include, but is not limited to battery status information, level of charging, distance travelled, top speed while driving, certified range for driving, average speed of the electric bike 100, and other similar information. The server may maintain the status information in a database for future access and analysis. This status information may also be used to determine or identify an electric bike that should be assigned to a user based on a destination provided by the user at the time of booking. By way of an example, based on the provided destination, an electric bike that has sufficient battery may be assigned to the user.

Based on the user performance reports and user compliance and safety reports stored on the server, the server may enable various electric bike operators to generate operator compliance reports and share the same with regulatory authorities in a given jurisdiction. The electric bike operators, for example, may be a food delivery company, a courier/package delivery company, or other similar service providers. The operator compliance reports may enable the electric bike operators to renew their operating license after getting approval from the regulatory authorities. The operator compliance reports are used as a proof to exhibit to the regulatory authorities that employees of the concerned electric bike operator are forced to adhere to various compliance rules. In some configurations, the server may be configured to automatically share such operator compliance reports for each of the electric bike operators with the regulatory authorities on periodic basis (for example, one operator compliance report per quarter). In some alternate configurations, the regulatory authorities may directly initiate a request for these operator compliance reports as and when required. In such configurations, the license renewal process may become seamless, transparent, and efficient.

Additionally, based on these operator compliance reports, the electric bike operators may be required to report users with repeated offences to law enforcement authorities along with proof of their repeated violations. The same data may also be readily shared with various electric bike operators, such that, notorious users are discouraged unanimously for safer roads and reduced accidents and/or other untoward incidents. In some configurations, the server may be configured to create a user blacklist which may include a list of repeat offenders. This blacklist may be accessed by all electric biker operators, law enforcement authorities, and regulatory authorities.

Figure 3:
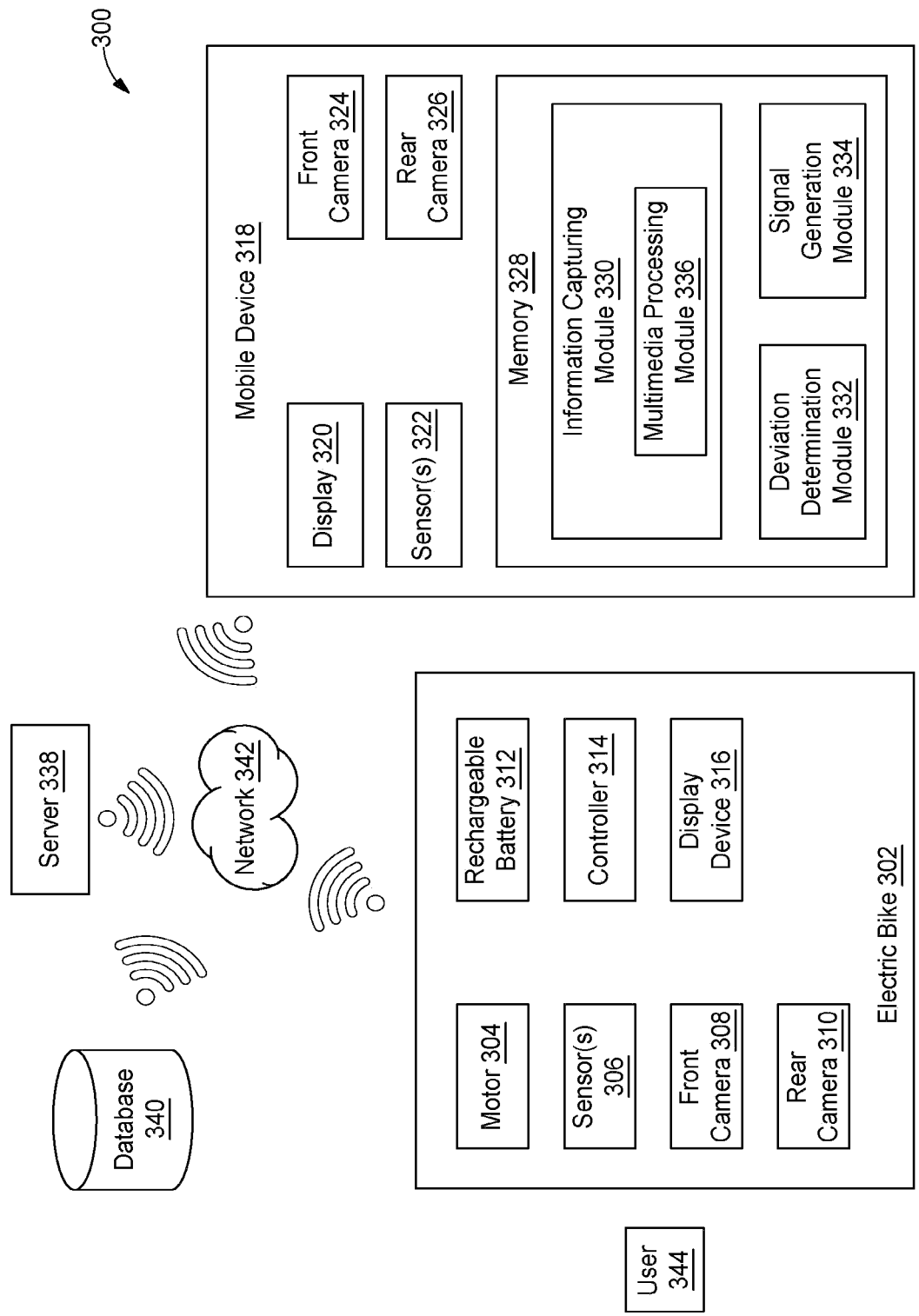
FIG. 3 illustrates a functional block diagram of a system for controlling an electric bike using AI, in accordance with some embodiments.

Referring now to FIG. 3, a functional block diagram of a system 300 for controlling an electric bike using AI is illustrated, in accordance with some embodiments. The system 300 may include an electric bike 302 (which is analogous to the electric bike 100). The electric bike 302 may further include a motor 304, one or more sensors 306, a rechargeable battery 312, and a controller 314. In some configurations, the electric bike 302 may also include a front camera 308, a rear camera 310, and a display device 316. The system 300 may further include a mobile device 318 that may include a display 320, one or more sensors 322, a front camera 324, a rear camera 326 and a memory 328. The memory 328 may further include an information capturing module 330 (that includes a multimedia processing module 336), a deviation determination module 332, and a signal generation module 334.

The mobile device 318, the electric bike 302, and a server 338 may communicate with each other via a communication network 342. The communication network 342 may be a wired or a wireless network and may vary based on entities between which the communication is currently active. For communication between the mobile device 318 and the electric bike 302, the communication network 342, for example, may be based on Bluetooth, Zigbee, Wireless Fidelity (WiFi), Near Field Communication (NFC), infrared, and other similar communication protocols. However, for communication between the mobile device 318 and the server 338 or the electric bike 302 and the server 338, the communication network 342, for example, may be Long Term Evolution (LTE), Worldwide Interoperability for Microwave Access (WiMAX), 5G cellular networks, V2X, V2V, V2I, and other similar wireless communication protocols. The communication with the server 338 may be real-time or may be intermittent based on network connectivity. In case of the network connection being bad or unavailable, the mobile device 318 and the electric bike 302 may locally store information and may then share the same with the server 338 on availability of network connectivity. The server 338 may further be coupled to a database 340 via the communication network 342. The database 340 may maintain records related to, for example, user details, usage details of the electric bike 302, performance statistics related to adhering to safety and regulatory standards set by local administration while using the electric bike 302. It will be apparent to a person skilled in the art that the server 338, for example, may be a central server, a cloud server, or a distributed server (to enable load balancing and data security). The server 338 may also be replaced by a distributed ledger network (for example, Blockchain).

In configurations where the mobile device 318 is mounted on the electric bike 302 and is communicatively coupled to the controller 314 of the electric bike 302, the information capturing module 330 may use the front camera 324 to capture the user information associated with a user 344, the rear camera 326 to capture the path information associated with a path being used to ride the electric bike 302, and the one or more sensors 322 and 306 to capture sensor information associated with the electric bike 302 and the mobile device 318. The information capturing module 330 may further include a multimedia processing module 336 which is configured to process audio, images, or video captured by the front camera 324 and the rear camera 326. The multimedia processing module 336 may include various image processing algorithms, AI models, and audio processing algorithms to extract the user information and the path information. The deviation determination module 332 may then detect any deviation as observed in the captured path information, the user information, and the sensor information by comparing with associated thresholds. Based on any determined deviations, the signal generation module 334 may generate an alert signal that may be rendered on a display screen of the mobile device 318. The signal generation module 334 may also generate a deactivating signal that may progressively curtail at least one functioning of the electric bike 302. This has already been explained in detail in conjunction with FIG. 1 and FIG. 2.

In other configurations, where the electric bike 302 includes the front camera 308, the rear camera 310, and the display device 316, the front camera 308 may capture user information associated with the user 344 using the electric bike 302 and the rear camera 310 may capture the path information. The one or more sensors 306 may capture sensor information associated with the electric bike 302. Based on the modules 330 to 338 stored in a memory within the electric bike 302, the controller 314 of the electric bike 302 may covert each of the user information, the path information, and the sensor information to corresponding information states and determine if any of these are deviating from associated predefine thresholds. In case of deviations, the controller 314 may generate an alert signal on a GUI via the display device 316 and/or a deactivating signal. The deactivating signal may gradually restrict at least one functioning of the electric bike 302. Such progressive and gradual restriction may enable providing an indication to the user 344 to strictly adhere to compliance rules. The indication may also be in the form of a warning or a fine (or potential fine). In some embodiments, the modules within the memory 328 may also be located in the server 338 instead of the mobile device 318. In such case, the server 338 may be responsible to perform the functionalities explained above for the modules 330 to 338.

In an embodiment, a sub-set of information states associated with the user information, the sensor information, and the path information may be shared with the server 338. The sub-set of information states are those that deviate from the associated predefined thresholds. The sub-set of information states may be shared by the mobile device 318 and/or the electric bike 302. Based on the received information, the server 338 may maintain a record of driving performance of the user 344 driving the electric bike 302, sensor information associated with the electric bike 302, and the path information associated with the electric bike 302. Further, the server 338 may be configured to determine a user rating based on prestored records of driving performance of the user 344, manage issuance of electric bikes to the user 344 based on the user rating (loyalty points and/or karma points) and determine charges and/or fines to be levied on the user 344 before issuance of the electric bike 302. As may be appreciated, the charges that may be levied may vary based on the user rating. By way of an example, a user with a low rating may be charged higher, while a user with very high rating may be offered various discounts and offers. Also, for user's with high ratings compliance requirements and corresponding warnings may be limited in case of danger zones or hot spots.

It should be noted that all such aforementioned modules 330-336 may be represented as a single module or a combination of different modules. Further, as will be appreciated by those skilled in the art, each of the modules 330-336 may reside, in whole or in parts, on one device or multiple devices in communication with each other. In some embodiments, each of the modules 330-336 may be implemented as dedicated hardware circuit comprising custom application-specific integrated circuit (ASIC) or gate arrays, off-the-shelf semiconductors such as logic chips, transistors, or other discrete components. Each of the modules 330-336 may also be implemented in a programmable hardware device such as a field programmable gate array (FPGA), programmable array logic, programmable logic device, and so forth. Alternatively, each of the modules 330-336 may be implemented in software for execution by various types of processors. An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 4:
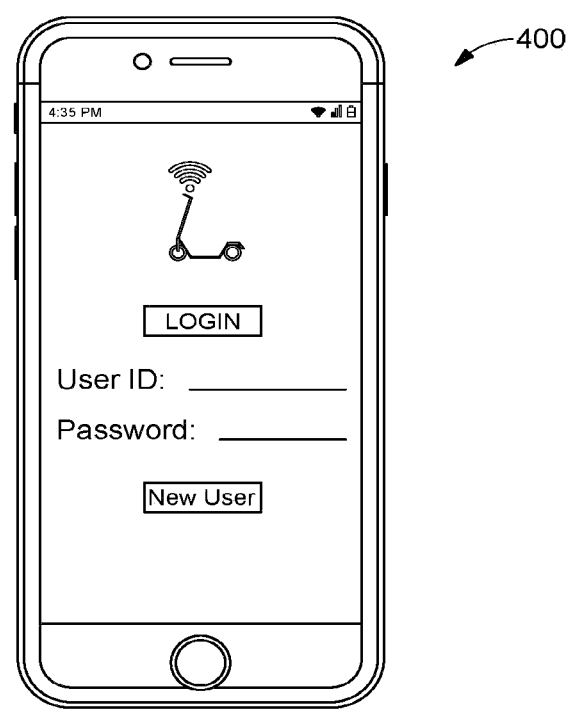
FIG. 4 illustrates a Graphical User Interface (GUI) depicting a login screen on a mobile device for logging into a mobile application configured to control an electric bike, in accordance with some exemplary embodiments.

With reference to FIG. 4, a Graphical User Interface (GUI) 400 depicting a login screen on a mobile device for logging into a mobile application configured to control an electric bike is illustrated, in accordance with some exemplary embodiments. The electric bike, for example, may be the electric bike 100. When a user plans to rent or initiate use of the electric bike, the user may log into the mobile application using login credentials of his account. However, if the user is a new user, the user may create a new account and may then log in into the mobile application to initiate use of the electric bike.

Upon successful login, the mobile application may be used by the user to track, enable, and/or disable functioning of the electric bike remotely, determining routes, checking if the user is following safety and driving standards, determine and overcome obstacles in a path, to protect theft of the electric bike, plan routes, run diagnostics, and other similar functions. In addition, when the user is a registered previous user, details pertaining to his credentials, access rights, usage history may be obtained from a database and displayed on the mobile application automatically. These credentials and access rights may also be provided to a service provider who may then provide the electric bike on rental basis. Based on the available user credentials and details, the service provider may allow or deny renting of the electric bike to the user and may also accordingly levy charges for use. It will be apparent that the functionality as discussed above may be provided as a service to a company that operates electric bikes.

As may be appreciated, the user may login into the mobile application by providing his username and password. Alternatively, credentials of the user may be verified by using a camera that captures facial attributes of the user and may allow access to the mobile application based on a comparison of the obtained user attributes with those prestored in the database. In case of a successful match, the user may be granted an access to use the mobile application and hence the electric bike. After recognition of the user as an already existing user, the mobile application may provide suggestions related to, for example, earlier routes taken, estimated time to reach a destination, riding speed, and the like. It will be apparent to a person skilled in the art that other user biometric data may also be used to provide access of the mobile application and the electric bike to the user.

In some embodiments, after the user logs into the mobile application, in order to rent the electric bike, the user may first provide details of a target destination, based on which the mobile application may provide details of available electric bikes in one or more electric bike parking zones nearest to the current location of the user. The available bikes shown to the user may be those that have sufficient charge to reach the target destination or may be to do a round trip in case the target destination does not have any electric bike parking zones nearby.

Once the user reaches one of the electric bike parking zones, the user opens an OCR scanning feature on the mobile application. The electric bike may have an OCR code imprinted on it, which may be scanned using the OCR scanning feature. Upon scanning the OCR code of the electric bike that was shown to have sufficient charge, the electric bike may be available for renting and use by the user. As discussed before, once the bike has been rented, details of the user, such as, username, residential address, gender, occupation, travel destination, previous usage statistics, and the like may automatically be obtained from a database (or example, the database 340) and may then be displayed on the mobile application. As may be appreciated, similar other non-limiting mechanisms may be used to provide the user with access to the electric bike.

Figure 5:
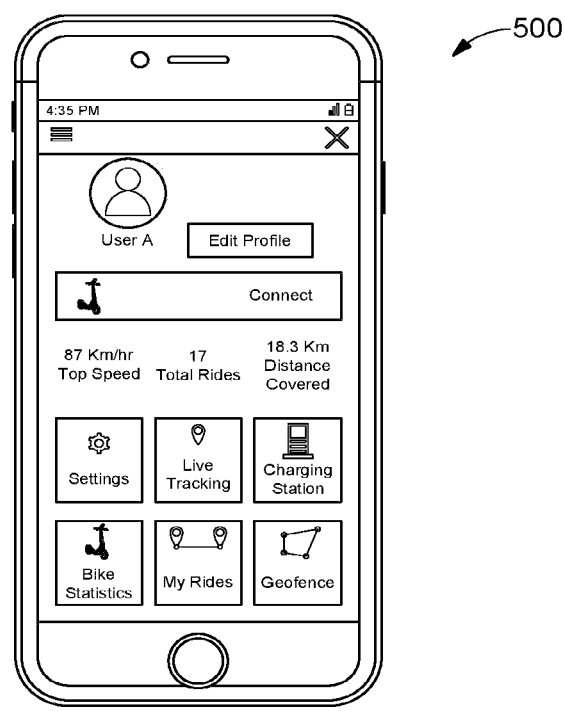
FIG. 5 illustrates a GUI of a mobile application depicting a set of options to operate the electric bike, in accordance with some exemplary embodiments.

With reference to FIG. 5, a GUI 500 of a mobile application depicting a set of options to operate the electric bike is illustrated, in accordance with some exemplary embodiments. Upon successful user login, the user may be presented with the set of options to manage use of the electric bike and to access details related to the electric bike. A user image as provided by the user may be presented as a profile picture on the GUI 500. Further, an option to edit the user profile may also be presented. The user profile may include information related to, but not limited to username, image, gender, age, electric vehicle usage history, loyalty points, karma points, number of violations, electric vehicle usage behavior and pattern, and other similar information. When the mobile device is placed on a mobile mount of the electric bike and is configured to be used along with the electric bike, a connect status may be presented on the GUI 500. The connect status may indicate that the mobile device is successfully connected to the electric bike and the mobile device may thus be able to send instructions to a controller of the electric bike in order to execute one or more instructions. The instructions, for example, may include performing operations, such as, user information determination, path information determination, sensor information determination, and the like.

Further, information related to the electric bike and use of the electric bike by the user may be displayed via the GUI 500. The information related to the electric bike may include, for example, top speed of the electric bike, number of previous rides, total distance covered, and other similar information. In addition, options related to additional settings for the electric bike, live tracking option for the electric bike, nearest charging station, options related to bike statistics, information related to number of earlier rides of the user, and geofence options may also be presented via the GUI 500.

Figure 6:
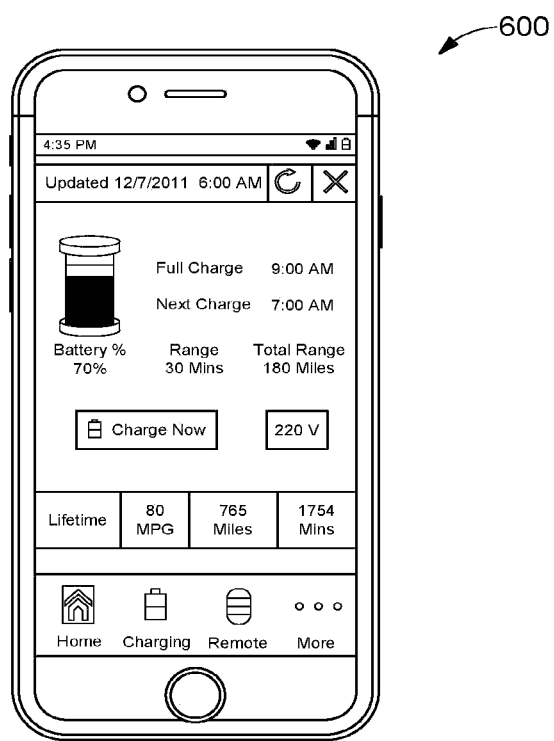
FIG. 6 illustrates a GUI of a mobile application depicting statistics information related to an electric bike, in accordance with some exemplary embodiments.

With reference to FIG. 6, a GUI 600 of a mobile application depicting statistics information related to an electric bike is illustrated, in accordance with some exemplary embodiments. When a user clicks on the 'bike statistics' option provided in the GUI 500, the GUI 600 may be displayed on the mobile application. The GUI 600, for example, may display battery details, for example, percentage of battery remaining, estimated time to fully charge the battery, and a predicted time for next charging when the electric bike is in use. A graphical indicator depicting a percentage of battery charge available within the battery may also be displayed. The GUI 600 may also display information related to total range of travel of the electric bike. Additionally, a charge now option may get displayed or activated on the GUI 600 when the battery of the electric bike may be extremely low on charge and may need to be charged for future use. The charge now option may be displayed in a particular color if charging of the electric bike is below a threshold level and/or is meeting the threshold level.

The GUI 600 may also include additional information related to, for example, amount of distance that the electric bike may travel with remaining battery power and an approximate time for which the battery may remain intact. Further, options related to, for example, charging, connection with remote device or an option to move to the home page of the mobile application may also be provided. It will be apparent to a person skilled in the art that the bike statistics information may be stored on the mobile device and simultaneously on a remote database as well. The bike statistics information stored in the remote database may later be accessible to the service provider for monitoring the usage and availability of the electric bike.

Figure 7:
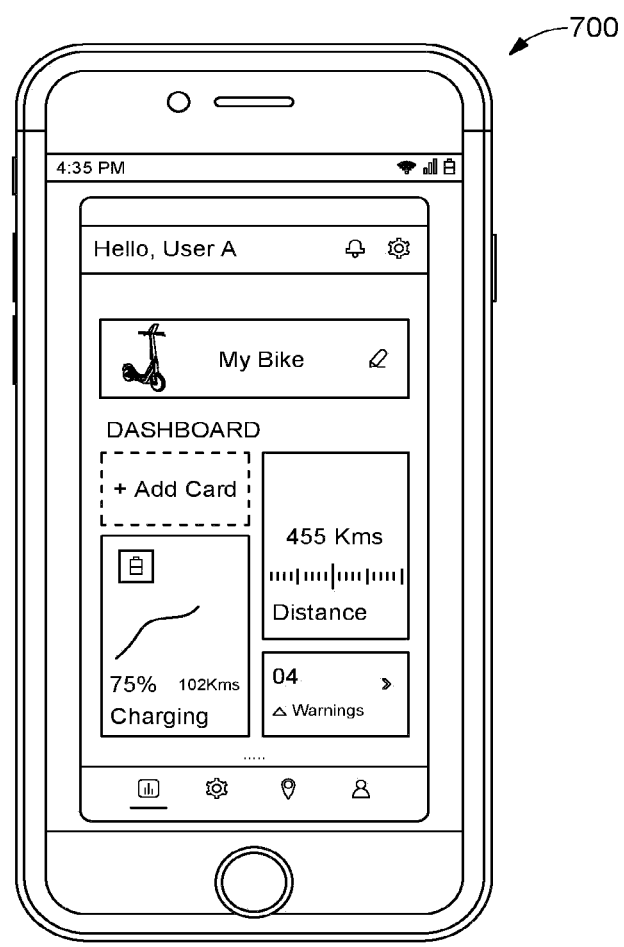
FIG. 7 illustrates a GUI of a mobile application depicting a performance dashboard that includes performance details related to an electric bike, in accordance with some exemplary embodiments.

Referring now to FIG. 7, a GUI 700 of a mobile application depicting a performance dashboard that includes performance details related to an electric bike is illustrated, in accordance with some exemplary embodiments. The GUI 700 may provide The dashboard within the GUI 700 may include details related to performance and various other attributes of the electric bike. The dashboard may provide information related to, for example, charging status, distance travelled by the electric bike, warnings related to, for example, battery shortage, network connectivity loss, lights ON during daytime, and the like.

The GUI 700 may also enable the user to add new additional features or widgets to the existing dashboard. These widgets, for example, may be applications as provided by other service providers that may be integrated with the mobile application. The applications provided by other service providers may include, for example, services provided for battery charging, information related to charging stations, food joints or eateries available along the path, and other similar applications. The widgets may be added to the dashboard within the GUI 700 using an "add card" option. Thus, multiple applications with various end uses may be added to the dashboard in order to provide the user with an enriching and immersive experience.

Figure 8:
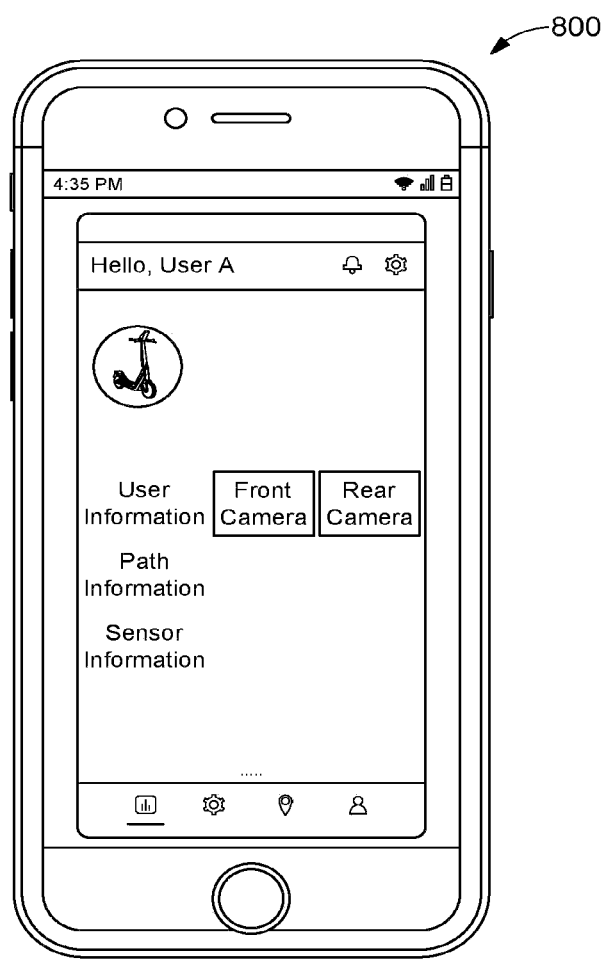
FIG. 8 illustrates a GUI of a mobile application depicting user information, path information, and sensor information as captured by the mobile application, in accordance with some exemplary embodiments.

Referring now to FIG. 8, a GUI 800 of a mobile application depicting user information, path information, and sensor information as captured by a mobile application is illustrated, in accordance with some exemplary embodiments. The user information that may include images of head, face, and eyes of the user captured using a front camera, may be indicated using a user information block. A degree/level of correctness or incorrectness related to capturing of the user information may be presented as warnings or messages. Based on the degree of correctness, the user may be instructed to adjust his position on the electric bike or the position of the mobile device so that correct user information may be captured via the front camera. In an alternate configuration, a mobile mount of the electric bike may automatically adjust the orientation of the mobile device so that accurate user information may be captured. This is further explained in detail in conjunction with FIG. 9.

Further, a level of correctness of the path information as captured using the rear camera may be determined. The path information may include, for example, one of lane location, pedestrian location, traffic lights, obstacle location, nearby vehicle location, deviations in the path, or surface data of the path. The surface data may include information related to road conditions, crossroads, potential obstacles, object trajectory, potholes, or other similar surface data. A degree/level of correctness or incorrectness related to capturing of the path information may be presented as warnings or messages. Based on the degree/level of correctness or incorrectness, the user may be instructed to adjust the position of the mobile device so that correct path information may be captured via the rear camera. For determining the sensor information, information captured by one or more sensors configured within the electric bike and the mobile may be analyzed. Any issues determined in terms of activation, non-functioning, incorrect functioning and use of the one or more sensors may be reported via the GUI 800. The user may also access this information proactively by accessing the sensor information block. For example, if pressure sensors are not operating correctly, a warning signal may be generated for replacement or the electric bike may be taken off the active fleet.

Figure 9:
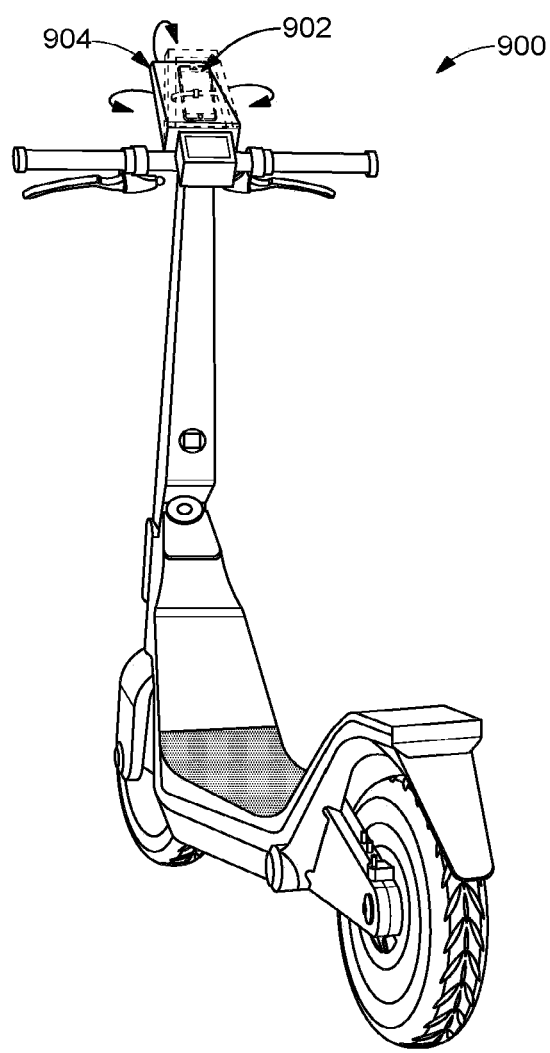
FIG. 9 illustrates a mobile mount of an electric bike that is configured to automatically adjust positioning of a mobile device mounted on the mobile mount, in accordance with some exemplary embodiments.

With reference to FIG. 9, a mobile mount 904 of an electric bike 900 that is configured to automatically adjust positioning of a mobile device 902 mounted on the mobile mount 904 is depicted, in accordance with some exemplary embodiments. The user may place the mobile device 902 on the mobile mount 904 and the mobile device 902 may be communicatively coupled to a controller (for example, the controller 106 and the controller 314). When a user rents the electric bike 900 and mounts it to begin riding the electric bike 900, a mobile application installed on the mobile device 902 and configured to communicate with the electric bike 900 may automatically adjust, via the controller, orientation of the mobile mount 904 in order to accurately capture user information (via a front camera of the mobile device 902) and path information (via a rear camera of the mobile device 902). The adjustment in the orientation may be done to position the mobile device 902 in a predetermined position. In some configurations, if the mobile device 902 is not in the predetermined position (or the desired position), the electric bike 900 may not be activated.

The predetermined position may relate to adjusting the mobile mount 904 such that a field of view of the front camera may accurately capture at least the head, the eyes, and the face of the user riding the electric bike 900, while at the same time a field of view of the rear camera accurately captures view of the path ahead of the electric bike 900. The adjustment of the rear camera may enable accurate determination of state of path, presence of obstacles on the path ahead, lane information, presence of pedestrians, and other similar information. In some alternate configurations, if the mobile device 902 only has the rear camera, the rear camera may first be used to capture user information and to determine whether the user is wearing a helmet or not, in order to unlock access to the electric bike 900. Thereafter, the rear camera may only be used capture the path information. To this end, once the user has placed the mobile device 902 on the mobile mount 904, the user may stand in the field of view of the rear camera and after access to the electric bike 900 has been granted, the rear camera may capture the path information.

As is illustrated, the mobile mount 904 may have an adjustable or rotatable head (which may be controlled by an actuator) that can at least be rotated by 90 degree in vertical and/or horizontal direction. The height of the mobile mount 904 may also be changed. The controller, prompted by the mobile application, may send instructions to the actuator in order to adjust orientation of the mobile mount 904 and thus placement of the mobile device 902. In a scenario when the user is a returning user, the mobile mount 904 of the vehicle may be adjusted as per predetermined user information maintained in a database. The database, for example, may be in the cloud. The user information related to, for example, height, body built and like may be used to determine a correct placement of the mobile mount 904 so that the mobile device 902 may also capture the user information accurately. The automatic adjustment of the mobile mount 904 may be done to ease use of the electric bike 900 by the user. This may free the user from manually adjusting the mobile device 902 to accurately capture the user information and the path information at the same time. The automatic adjustment of the mobile mount 904 may be helpful in situations when the user is in a rush to use the electric bike 900 or may be a first time user.

Figure 10A:
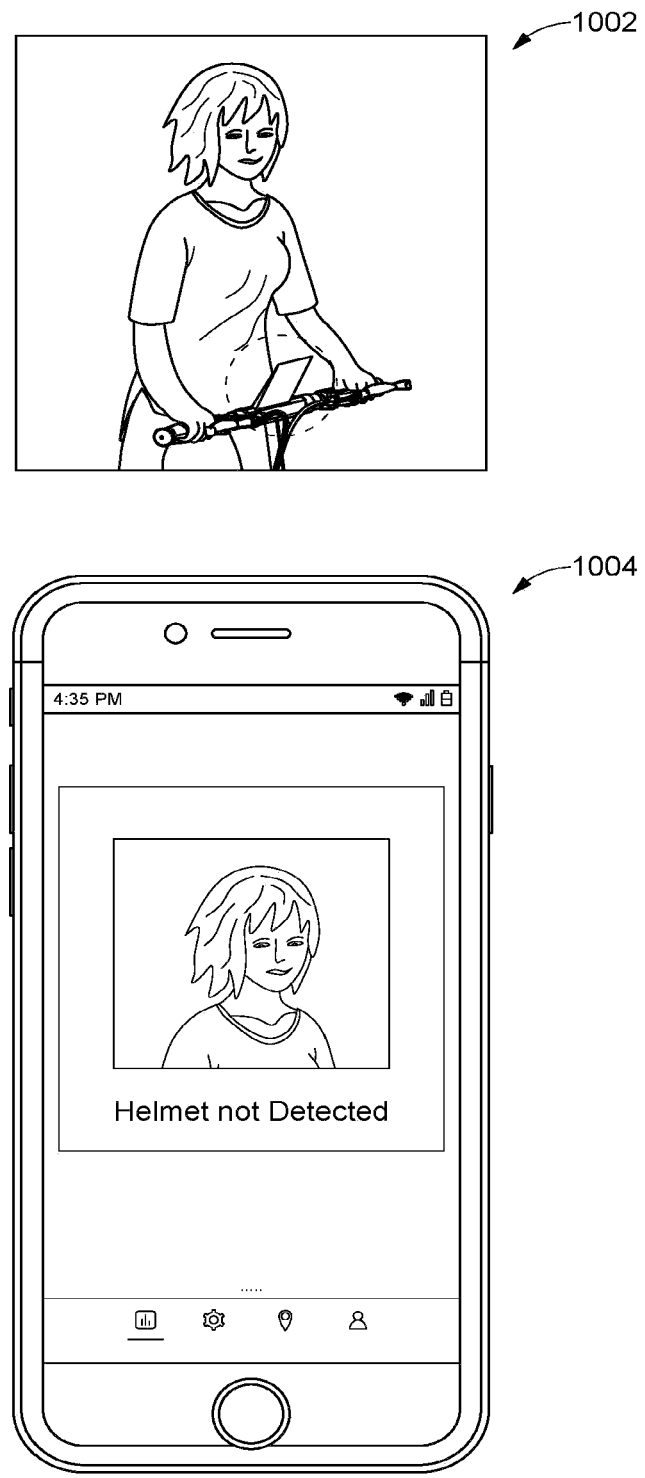
FIGS. 10A and 10B illustrate capturing of user information to detect whether a user is wearing a helmet, in accordance with some exemplary embodiments.
Figure 10B:
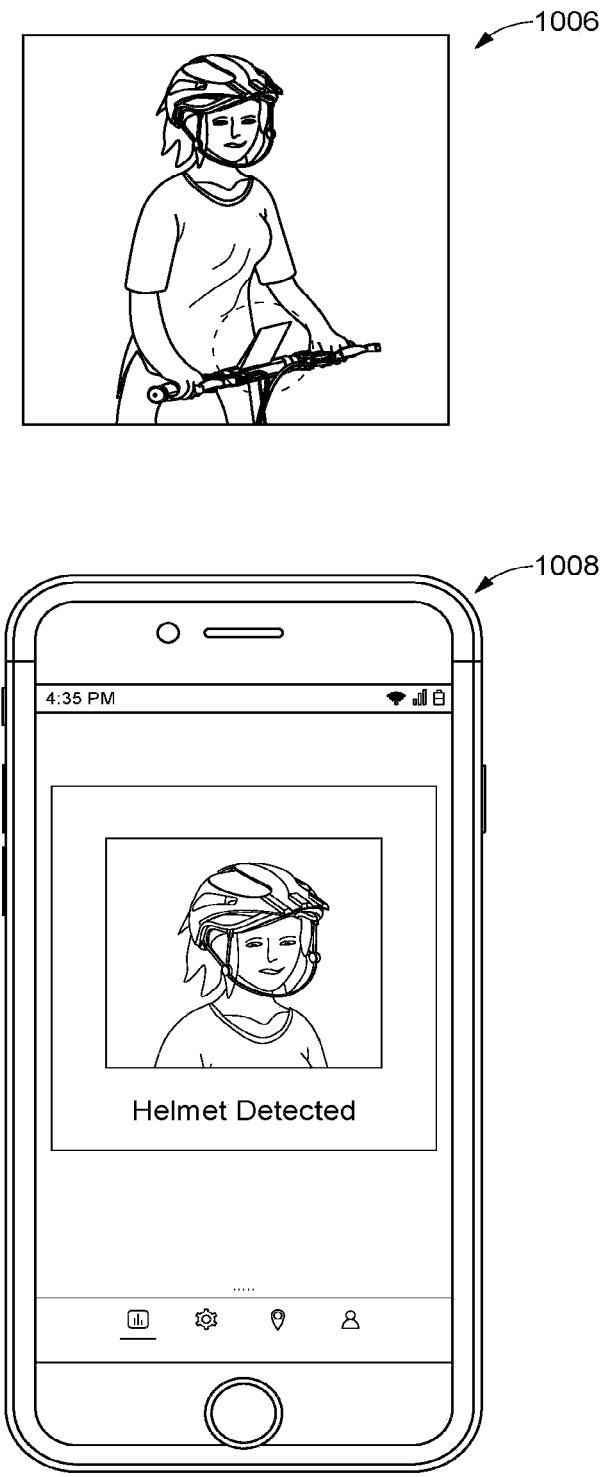

Referring now to FIGS. 10A and 10B, capturing of user information to detect whether a user is wearing a helmet is illustrated, in accordance with some exemplary embodiments. A front camera of a mobile device or the electric bike captures user information by way of images clicked by the front camera. An AI based application (either installed on the mobile device or on a cloud server) may process these images to determine whether the user is wearing a helmet or not. The AI based application may be trained based on multiple training images of people wearing helmets, people not wearing helmets properly, and people not wearing helmets at all. The AI based application may also be trained based on false positives that may be detected when the user may be wearing a headgear, which is not a helmet.

FIG. 10A depicts a scenario of a user not wearing a helmet. At 1002, the user who is not wearing a helmet and is standing on an electric bike is depicted. At 1004, detection, by the AI based application, of the user not wearing the helmet is depicted. Thus, the user may be indicated that he is not wearing a helmet and thus may not be allowed to operate or use the electric bike. FIG. 10B depicts a scenario of a user wearing a helmet. At 1006, the user who is wearing a helmet and is standing on an electric bike is depicted. At 1008, detection, by the AI based application, of the user wearing the helmet is depicted. Thus, the user may be indicated that he is wearing a helmet and thus may be allowed to operate or use the electric bike. In some configuration, if the user is wearing a helmet, no such indication of detecting the helmet may be provided to the user. Instead, such depiction may be provided to an administrator of a bike rental company which operated the electric bike.

Figure 11:
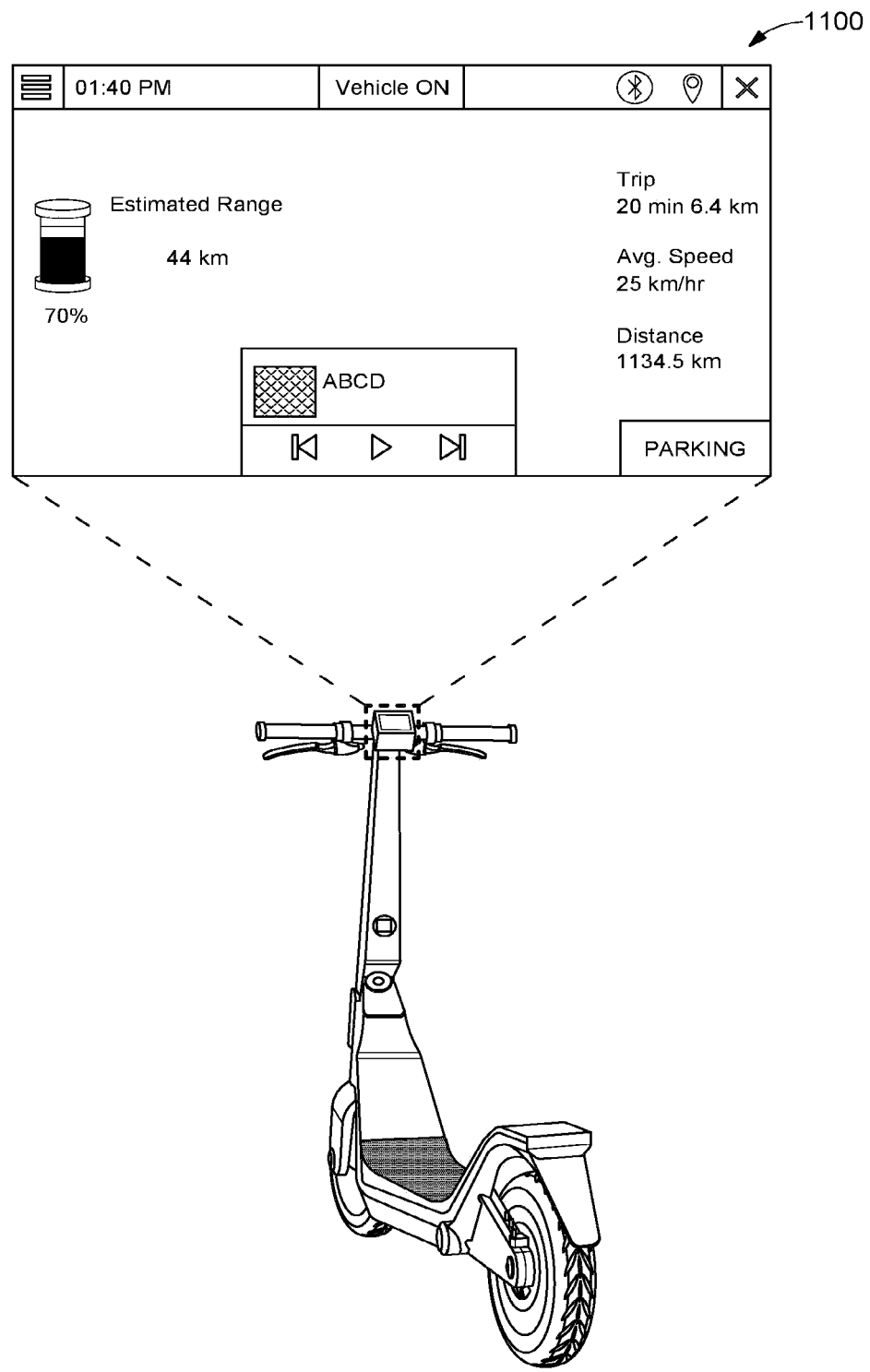
FIG. 11 illustrates a GUI displaying information on a display screen configured within an electric bike, in accordance with some exemplary embodiments.

Referring now to FIG. 11, a GUI 1100 displaying information on a display screen configured within an electric bike, in accordance with some exemplary embodiments. The electric bike of this embodiment may be the electric bike 200 and the display screen may be the display screen 116 integrated within the electric bike 200. The electric bike in this embodiment may not include the mobile mount. GUI 1100 may display information related to, for example, percentage of battery available and an estimated distance the electric bike may cover using the available battery percentage. Further, information related to distance covered by the electric bike, time taken to cover a particular distance and average speed of the electric bike when in use, is displayed. It may be apparent that the GUI 1100 may only be displayed when the electric bike is stationary.

A parking option may also be displayed on the display screen. When the parking option is selected, the electric bike may cease to operate and operations of motor, controller, and battery may be halted. In an embodiment, while riding the electric bike, the user may connect his mobile device to the electric bike using a wireless connection, for example, Bluetooth. When the mobile device is connected to the electric bike, the user may access his mobile device through the display screen. By way of an example, the user may control his choice of song to be played on the mobile device through the display screen. As may be appreciated, the user may also be provided with notifications related to incoming calls on the mobile device and the user may accept or deny taking the call using the display screen itself only when the electric bike is stationary.

Figure 12:
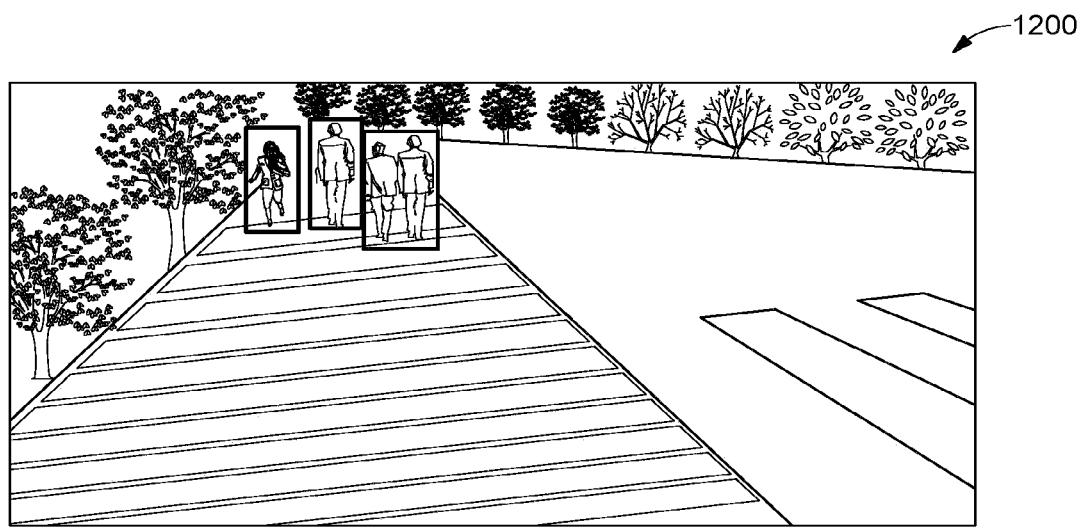
FIG. 12 depicts identification of people as multiple obstacles in the path of an electric bike via an AI based mobile application, in accordance with some exemplary embodiments.

Referring now to FIG. 12, identification of pedestrians as multiple obstacles in the path of an electric bike via an AI based mobile application is depicted as 1200, in accordance with some exemplary embodiments. Pedestrians (whether stationary or moving towards or away from the electric bike) in the path of the electric bike may be identified as multiple obstacles or obstructions by the AI based mobile application, based on real-time processing of the path information captured by a rear camera. The AI based mobile application may also predict future path that may be taken by other objects. The rear camera may be that of a mobile device mounted on the electric bike or a rear camera integrated within the electric bike. Other than pedestrians, the obstacles may, for example, include vehicles, such as, cars, e-bikes, other electric scooters, potholes, planters, and the like.

As illustrated, once pedestrians (or any other objects for that matter) are identified as obstacles or potential collision objects present on the path, the AI based mobile application renders a bounding box around each of them. Each bounding box may further be rendered in a particular color, such that, each color may correspond to the relative distance between the electric bike and each of the pedestrians and to probability of collision of no immediate action is taken. The relative distance may be determined based on movement pattern of the electric bike and each of the pedestrians. By way of an example, when the relative distance between a pedestrian and the electric bike is fast above a predefined threshold, the color of the bounding box may be set as green. This may indicate that the pedestrian may be at a safe distance from the electric bike and the chances of a collision are minimal. By way of another example, when the relative distance between a pedestrian and the electric bike is fast approaching a predefined threshold, the color of the bounding box may be set as orange. This may indicate that the pedestrian may not be at a safe distance from the electric bike and the chances of a collision are high. By way of yet another example, when the relative distance between a pedestrian and the electric bike less than or equal to a predefined threshold, the color of the bounding box may be set as red. This may indicate that the pedestrian may be in danger and the chances of a collision are imminent unless an action is taken. The action, for example, may be taking a detour or stopping the electric bike. In some configurations, the rendering bounding boxes by the AI based mobile application may only be collected on a server in the cloud and may not be rendered to the user. Instead, as explained before, a predetermined element (for example, color, image, or theme) may be displayed on the screen of the mobile device of the user.

In an embodiment, in order to render the bounding boxes, a sequence of images captured by the real camera of the mobile device may be processed via an obstacle classification algorithm. The obstacle classification algorithm may perform image segmentation in order to extract pixels that correspond to the path and pedestrians on it. Based on this, characteristic points inside an area of the obstacle, their description and tracking in the subsequent frames may be determined. Thereafter, estimation of distance between the camera and each of the pedestrians and the rate of change of the distance may be performed. This may thus take into account determine which pedestrian is stationary, moving towards the electric bike, or moving away from the electric bike.

In an embodiment, different types of sensors, for example, active sensors (e.g., Radio Detection and Ranging (RADAR) or Light Detection and Ranging (LIDAR)) to passive sensors (e.g., camera) may be used to determine presence of the obstacles on the path. Further, a Digital Elevation Map (DEM) algorithm may be used to detect obstacles relying on fact that they protrude up from a dominant ground surface of the path. The obstacle detection algorithm uses density of 3D points as a criterion to detect the obstacles. As may be appreciated multiple similar algorithms and their combination may be used to detect pedestrians (or obstacles) on the path on which the electric bike is moving. By way of an example, multiple 2D views may be used to generate or determine a 3D view.

Figure 13:
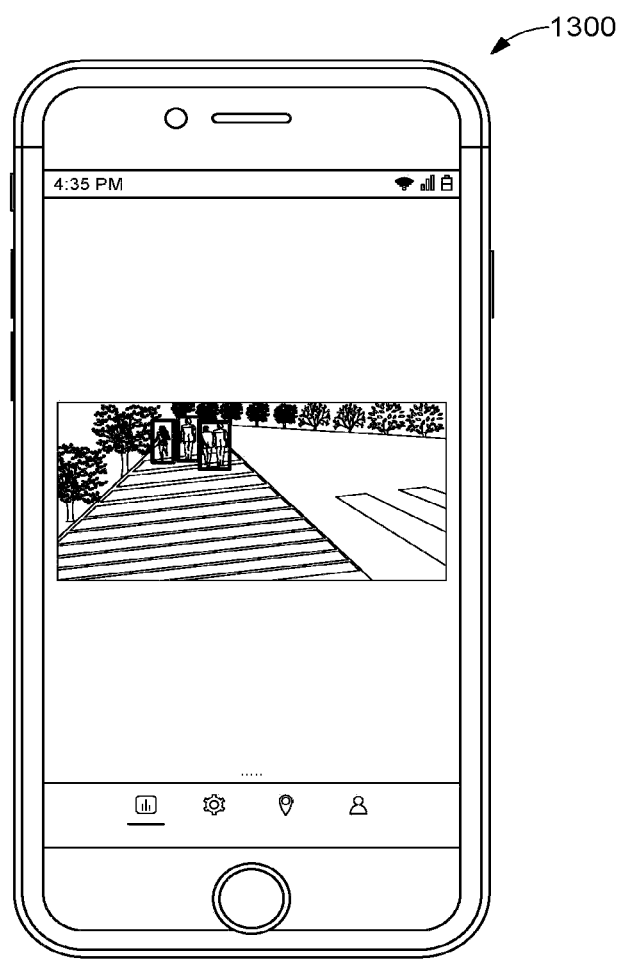
FIG. 13 illustrates a GUI of a mobile application depicting identification of people as multiple obstacles in a path of an electric bike via a mobile device, in accordance with some exemplary embodiments.

In addition to rendering the colored bounding boxes, when one or more pedestrians may collide with the electric bike, relevant warnings may be generated to the user. Further, operations of the electric bike may also be controlled, for example, speed of the electric bike may be curtailed or reduced drastically, horn of the electric bike may automatically be activated for alerting the pedestrians, or other similar warning signs may be executed. It will be apparent to a person skilled in the art that the aforementioned analysis may be performed at the backend and the rendering of bounding boxes may not be presented to the user. In such case, a probability of collision may be indicated to the user by simply changing the color of the entire display screen of the mobile device. For example, when the probability of a collision is very high, entire screen of the mobile device may go red. In some implementation though, a GUI 1300 of a mobile application may be used to render bounding boxes on pedestrians identified as obstacles in the path of the electric bike via the mobile device. This is illustrated in FIG. 13.

Figure 14:
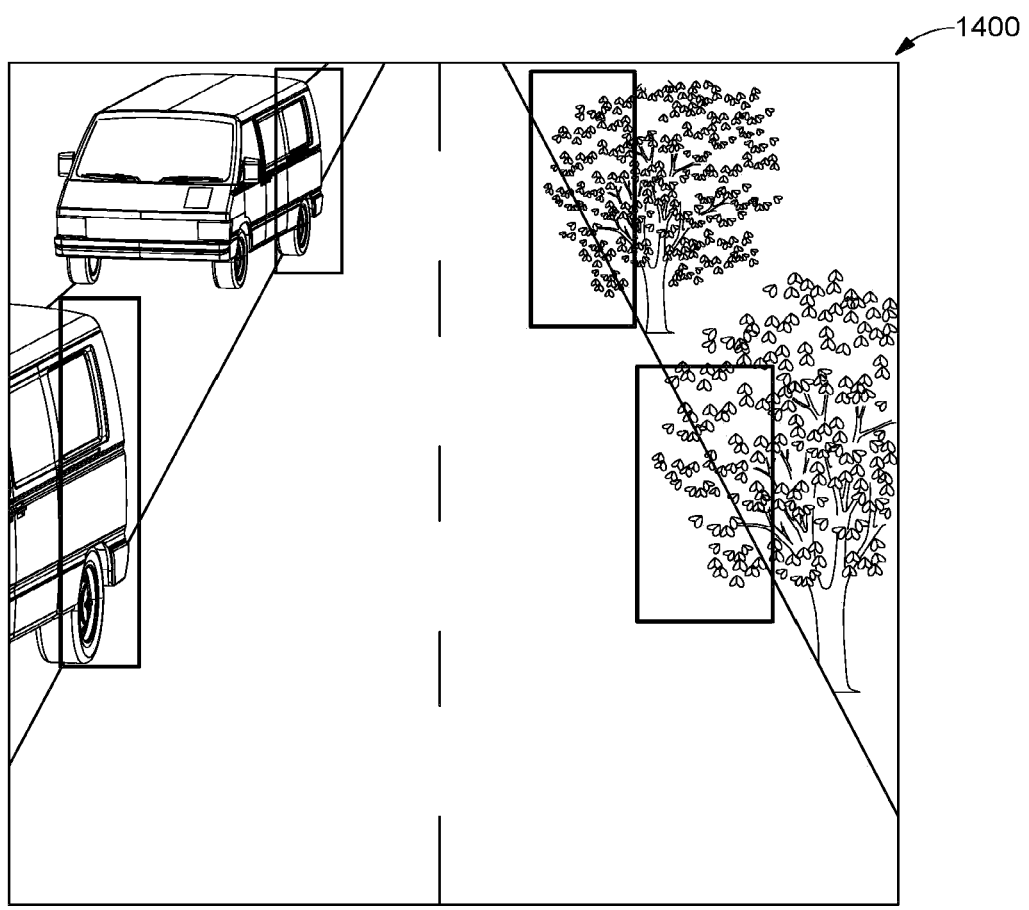
FIG. 14 depicts identification of objects as multiple obstacles located near a path of an electric bike via an AI based mobile application, in accordance with some exemplary embodiments.
Figure 15:
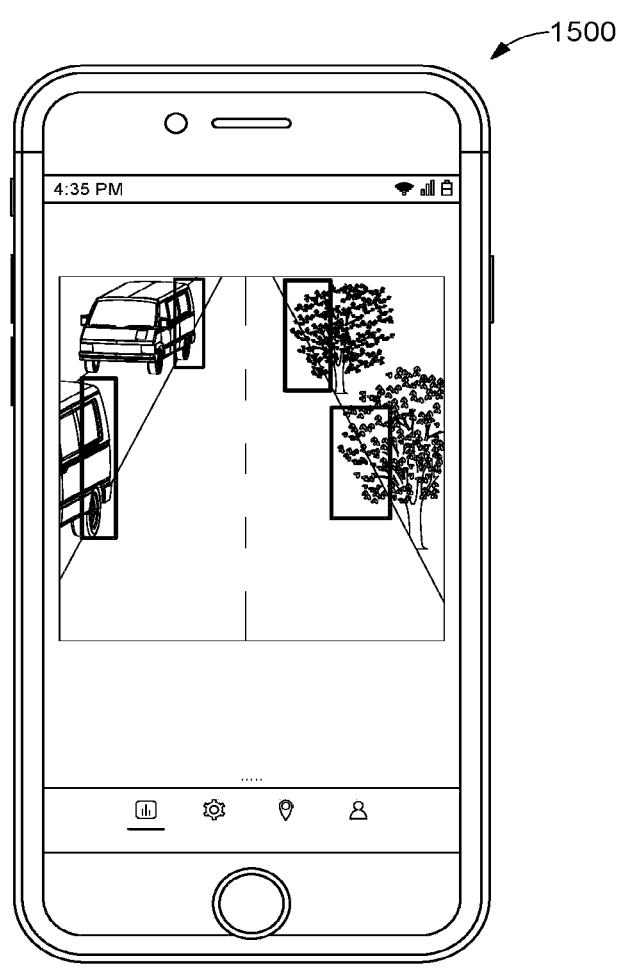
FIG. 15 illustrates a GUI of a mobile application depicting identification of innate objects as multiple obstacles located near a path of an electric bike via a mobile device, in accordance with some exemplary embodiments.

Referring now to FIG. 14, identification of objects as multiple obstacles located near a path of an electric bike via an AI based mobile application is depicted as 1400, in accordance with some exemplary embodiments. Unlike depiction in FIG. 12, the objects for example, may be stationary cars, electric bikes, electric scooters, potholes, trees, unidentified objects and the like. Additionally, the objects in FIG. 14 may not be present directly on the path of the electric bike, but may either be partially covering the path or may be cantilevering on the path (for example, branches of trees). To a normal eye such obstacles may not lead to an issue, however, the AI based mobile application may be able to identify these objects as obstacles based on the method explained in FIG. 12. This may help identifying obstacles, which may not seem like obstacles to normal eye and may thus prevent injuries to the user or damage to the objects (for example, parked cars or other vehicles). In some configurations, information shared by other riders of electric bikes, for example, road conditions and past accidents may also be used to identify such possible obstacles or situations. In some implementation, a GUI 1500 of a mobile application may be used to render bounding boxes on objects identified as obstacles near the path of the electric bike via the mobile device. This is illustrated in FIG. 15.

Figure 16:
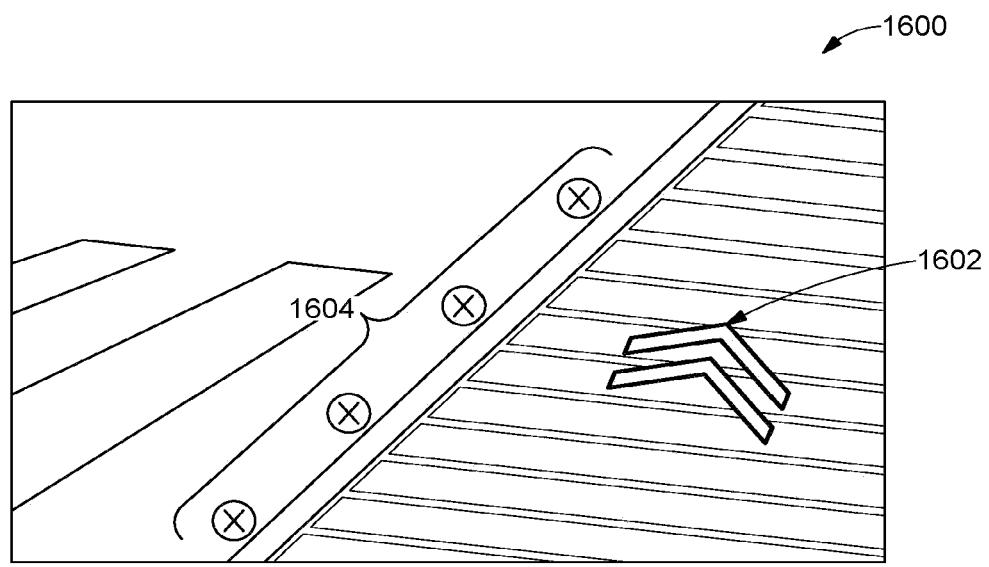
FIG. 16 depicts identification of a bike lane via an AI based mobile application for movement of an electric bike, in accordance with some exemplary embodiments.
Figure 17A:
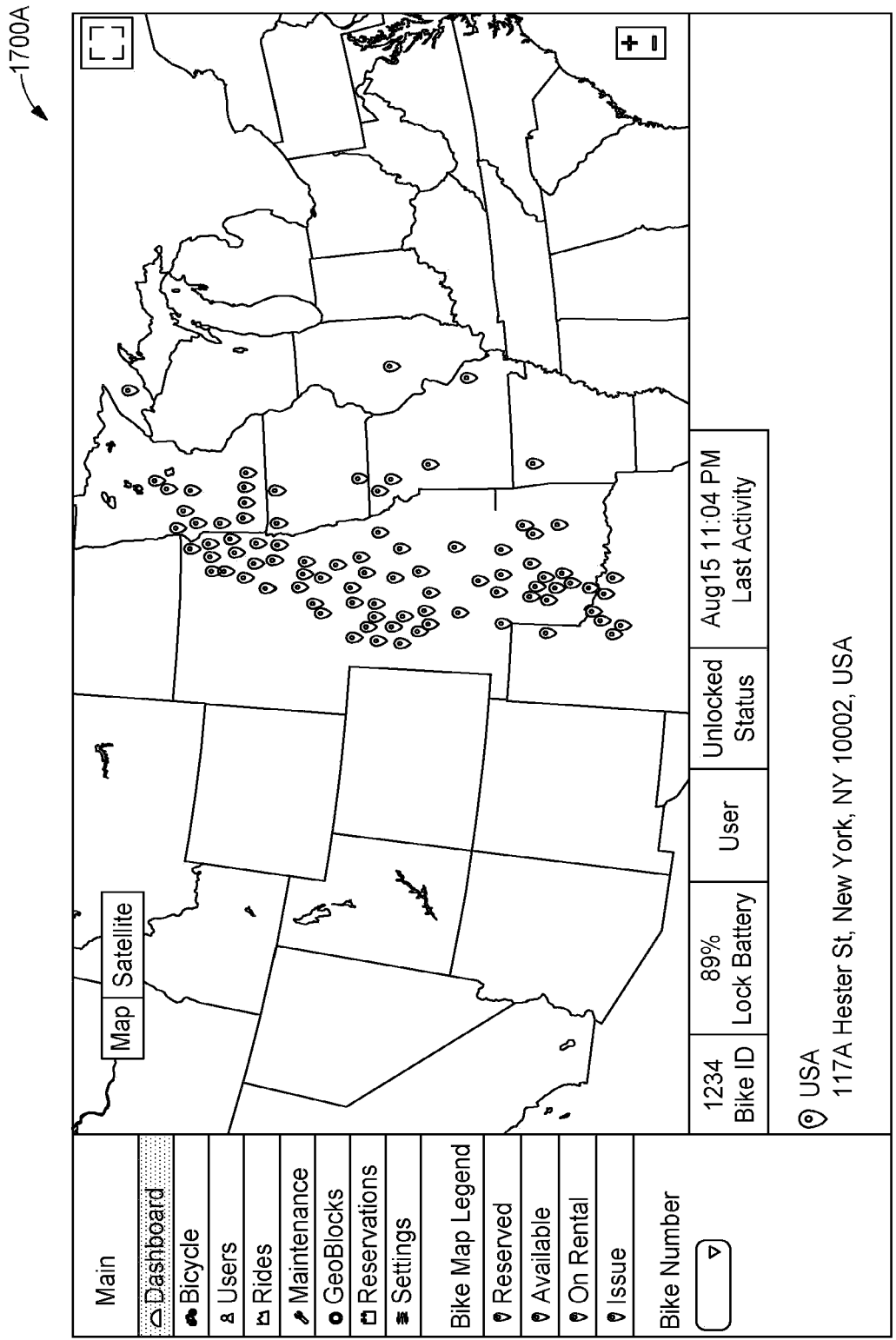
Figure 17B:
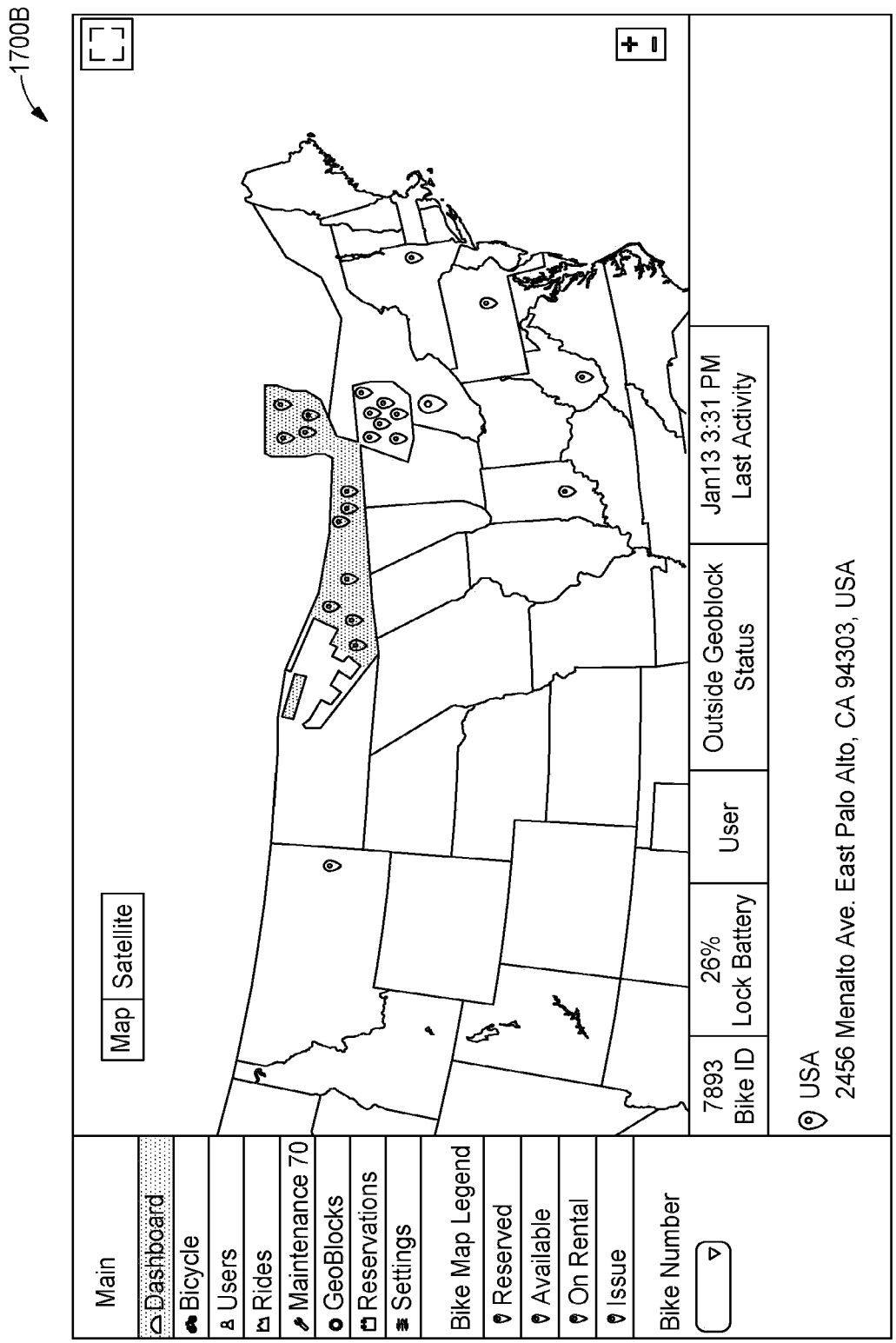
Figure 17C:
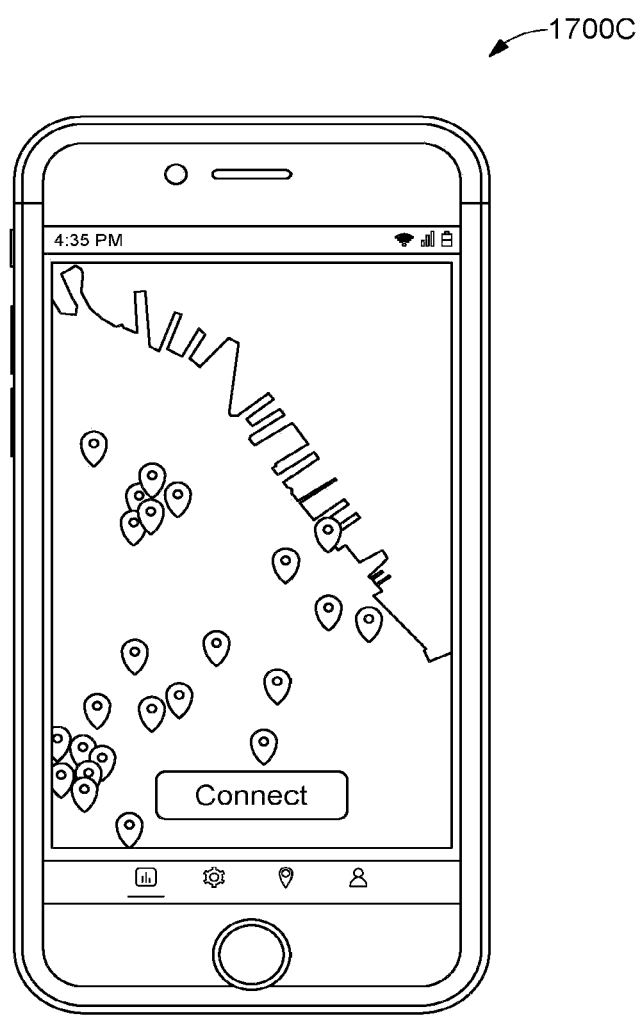

Referring now to FIG. 16, identification of a bike lane via an AI based mobile application for movement of an electric bike is depicted via 1600, in accordance with some exemplary embodiments. When the electric bike is being ridden, a rear camera of the mobile device mounted on the electric bike may be used to ascertain and confirm whether the electric bike is being ridden on a designated bike lane or not. If the electric bike is being ridden on a path outside the set boundaries of the bike lane, a notification in the form or an alert or a warning may be sent to the user via the mobile application. If the user does not adhere to these alerts or warnings and does not return to the bike lane, one or more functionalities of the electric bike may gradually and progressively be curtailed or restricted. Additionally, the user's loyalty and/or karma points may be lost in addition to potential fines.

To further assist the user in adhering to the designated bike lane and avoiding accidental movement in a non-designated lane, a correct lane indicator 1602 may be augmented over a real-time view being captured by the rear camera of the mobile device. The correct lane indicator may thus help the user to restrict his/her movement in the designated bike lane. Additionally, boundary limiters 1604 may also be augmented over a real-time view being captured by the rear camera of the mobile device. The boundary limiters 1604 may help the user in determining the exact boundaries of the designated bike lane. In some embodiments, such boundary limiters 1604 (or similar graphical elements) may help the user in identifying areas that are banned or restricted for movement of electric bikes.

Referring to FIGS. 17A to 17D, admin GUIs 1700A, 1700B, 1700C, and 1700D that are displayed to an administrator are illustrated, in accordance with some exemplary embodiments. It will be apparent to a person skilled in the art that information similar to that displayed in the GUIs 500, 600, 700, and 800 of a mobile application may also be available to the administrator. In addition to this information, the administrator may be provided the admin GUI 1700A gives a birds eye view, on a map, of live locations of electric bikes that are currently active and owned by an entity associated with the administrator. The entity, for example, may be an electric bike rental company or a service provider that may be providing these services to various electric bike rental companies. The admin GUI 1700A may be interactive, such that, the administrator can specifically locate a given electric bike on the map along with its current statistics.

If one or more electric bikes that are configured to remain within a particular geographical area, cross boundaries of that geographical area, the administrator may be immediately provided this information along with the current location of these electric bikes and their respective statistics via the admin GUI 1700B. The administrator may also be able to access similar information as depicted in admin GUIs 1700A and B, via the admin GUI 1700C. In addition to monitoring live location of the electric bikes, the administrator, via the admin GUI 1700D may also be able to determine various objects or people encountered by an electric bike during a given trip. The GUI 1700D may also provide the administrator with information related to location of these objects/people, time of encountering these objects/people, and whether there was a possibility of collision with these objects/people.

Figure 18:
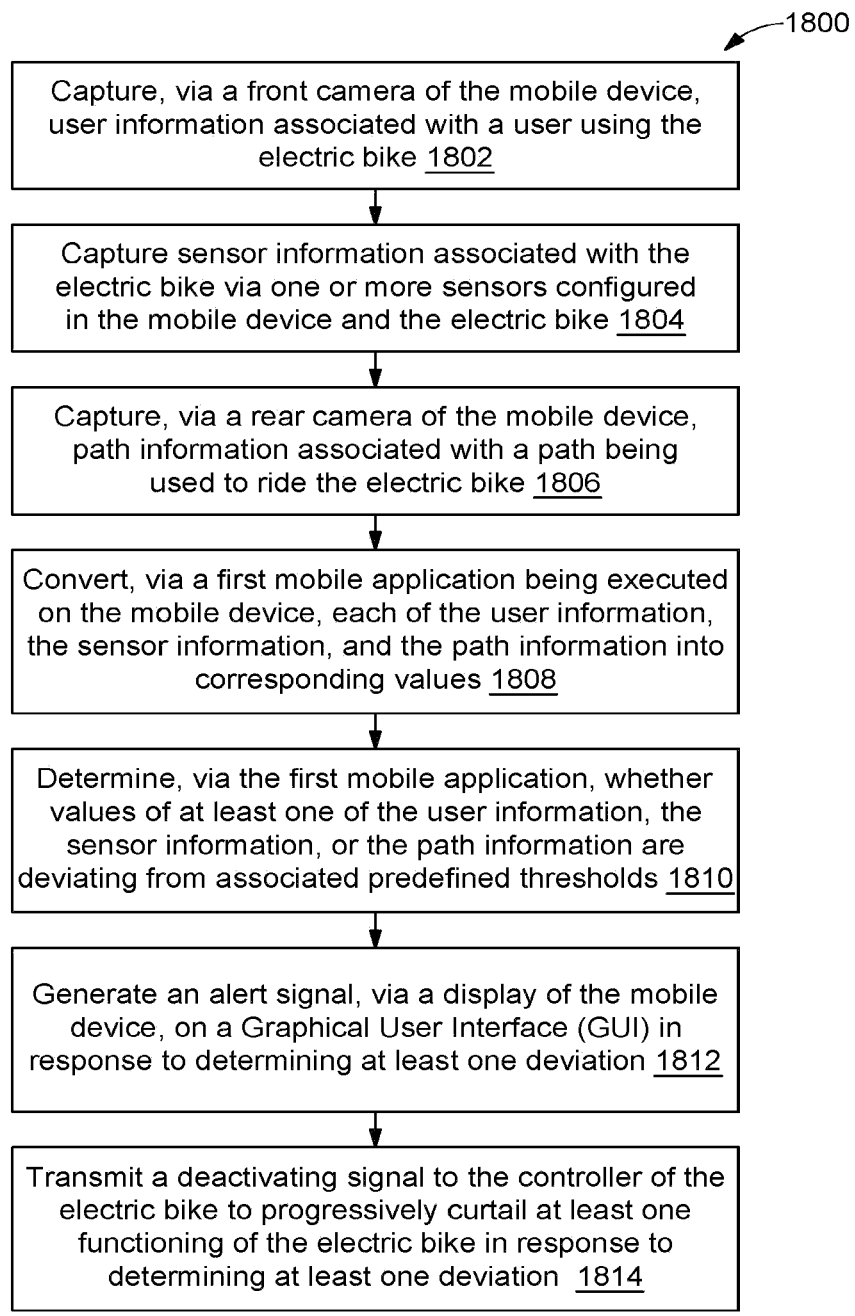
FIG. 18 illustrates a flowchart of a method for controlling an electric bike using AI, in accordance with some embodiments.

With reference to FIG. 18, a flowchart of a method 1800 for controlling an electric bike using AI, is illustrated, in accordance with some embodiments. When the mobile device is placed on a mobile mount of the electric bike, the mobile device is communicatively coupled to a controller within the electric bike. After the mobile device is communicatively coupled to the controller, at step 1802, the mobile device (a first mobile application configured within the mobile device) may then use a front camera of the mobile device to capture user information associated with a user using the electric bike. The user information may correspond to images of at least one of the head, the face, and the eyes of the user riding the electric bike. At step 1804, the mobile device may capture sensor information associated with the electric bike via one or more sensors configured in the mobile device and the electric bike. The sensors may include, but are not limited to at least one of a gyroscope, a compass, a motion sensor, a pressure sensor, a temperature sensor, position sensors, proximity sensors, or 3D accelerometer. At step 1806, the mobile device may use its rear camera to capture path information associated with a path on which the electric bike is driven. The path information may include at least one, but is not limited to lane location, pedestrian location, traffic lights, obstacle location, nearby vehicle location, deviations in the path, or surface data of the path. It will be apparent to a person skilled in the art that the steps 1802, 1804, and 1806 may be executed in parallel.

Subsequently, the mobile device may convert each of the user information, the sensor information, and the path information into corresponding information states, at step 1808. The conversion may be done via a first mobile application that is executed and configured on the mobile device. Further, the first mobile application may determine whether information states of at least one of the user information, the sensor information, or the path information are deviating from associated predefined thresholds, at step 1810. When the information states are numerical values, the associated predefined thresholds may also be numerical values. In some embodiments, the associated predefined thresholds may be determined by an AI model. The AI model may be trained to determine thresholds based on at least one of a training set of user information, a training set of sensors information, and a training set of path information. In other words, thresholds determined by the AI model may not be fixed and may vary based on various factors as captured by way of the user information, the sensor information, and the path information. The associated predefined thresholds may correspond to a set of compliance rules that are jurisdiction specific. The associated predefined thresholds may include, for example, traffic rules, safety rules, or administration defined rules.

In case a deviation is determined, an alert signal may be generated on a GUI, at step 1812. The GUI may be associated with a display of the mobile device. In addition to generation of the alert signal, a deactivating signal may be transmitted to the controller of the electric bike at step 1814. The transmission of the deactivating signal may progressively curtail at least one functioning of the electric bike in response to determination of at least one deviation. On occasions when the user is detected driving the electric bike outside bounds of the associated threshold, the alert signal may be generated and a deactivation signal related to operation of the electric bike may be generated, for example, battery supply or display of direction instructions, may be restricted. In some embodiment, the steps 1802 to 1814 may be executed by the controller. This has already been explained in detail in conjunction with FIG. 1 to FIG. 15.

Figure 19:
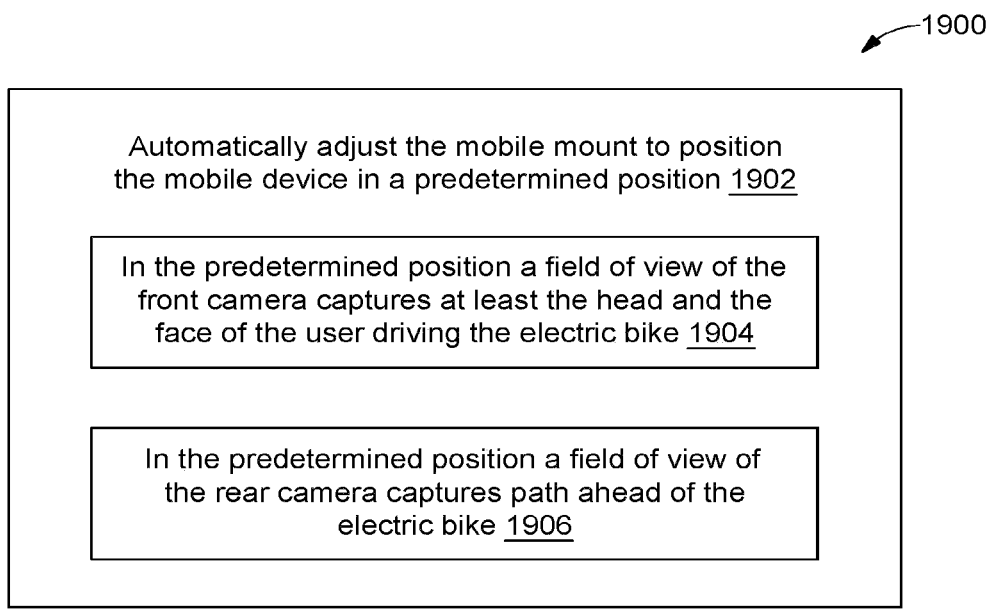
FIG. 19 illustrates a flowchart of a method for automatically adjusting a mobile mount, in accordance with some embodiments.

With reference to FIG. 19, a flowchart of a method 1900 for automatically adjusting a mobile mount of an electric bike is illustrated, in accordance with some embodiments. Once the mobile device is placed on the mobile mount for the first time and is communicatively coupled with a controller of the electric bike, the mobile mount of the electric vehicle may be automatically adjusted to position the mobile device in a predetermined position, at step 1902. In an embodiment, the predetermined position may correspond to a position of the mobile device such that a field of view of the front camera of the mobile device may capture at least head, eyes and face of a user driving the electric bike, at step 1904. Additionally, the predetermined position may correspond to a position of the mobile device such that a field of view of the rear camera of the mobile device may capture the path ahead of the electric bike, at step 1906. As may be appreciated, setting of accurate field of view of the front camera and the rear camera may be pertinent to safe driving of the electric bike. This may also ensure that the user while driving the electric bike has his focus on the road and is not inebriated or drowsy. Additionally, this may ensure that the path on which the electric bike is being driven is clear of obstacles. Additionally, an AI base mobile application installed on the mobile device may also be able to determine that the user is indulging in erratic and/or dangerous driving based on information captured by the rear camera and/or the front camera.

Figure 20:
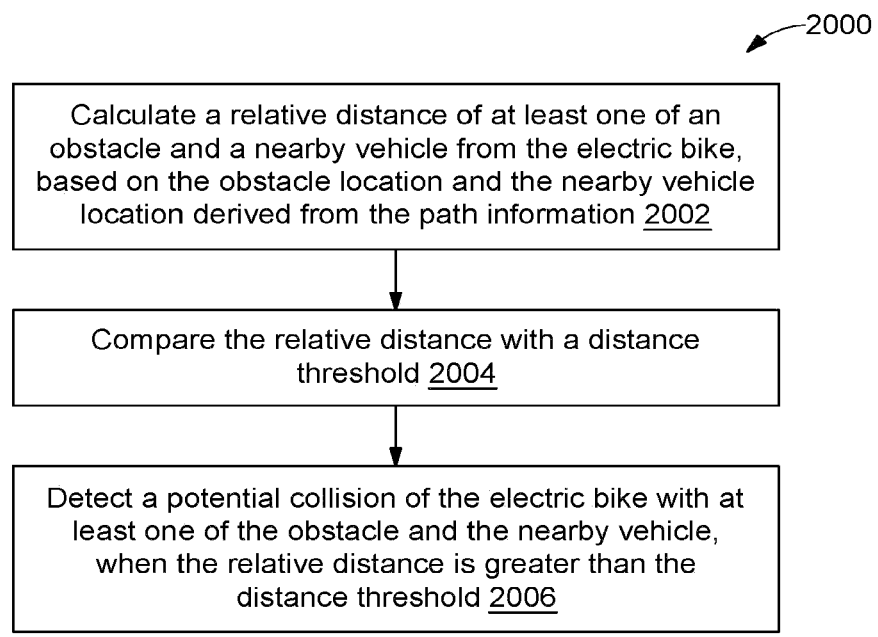
FIG. 20 illustrates a flowchart of a method for calculating a relative distance of an obstacle and electric bike to avoid a collision, in accordance with some embodiments.

With reference to FIG. 20, a flowchart of a method 2000 for calculating a relative distance of an obstacle and an electric bike to avoid a collision is illustrated, in accordance with some embodiments. When the electric vehicle is driven on a path, various obstacles may be encountered that may be moving or stationary. The various obstacles on or near the path, for example, may be pedestrians, pets, speed bumps, random objects, trees, plants, debris, or any other similar obstacle. To avoid collision of the electric bike with one or more of an obstacle and a nearby vehicle, the method 2000 may calculate a relative distance and trajectory of one or more the obstacle and the nearby vehicle from the electric bike, at step 2002. The relative distance may be based on the obstacle location and the nearby vehicle location derived from the path information. The relative distance may be measured in terms of a numerical measurement of how far apart the obstacle location and the nearby vehicle location is from the current location of the electric bike and may be measured in, for example, meter units. The relative distance may be compared with a distance threshold, at step 2004. Further, when the calculated relative distance is less than the distance threshold, a potential collision of the electric bike with one or more of the obstacle and the nearby vehicle may be detected, at step 2006. This has already been explained in detail in conjunction with FIG. 1 to FIG. 15.

Figure 21:
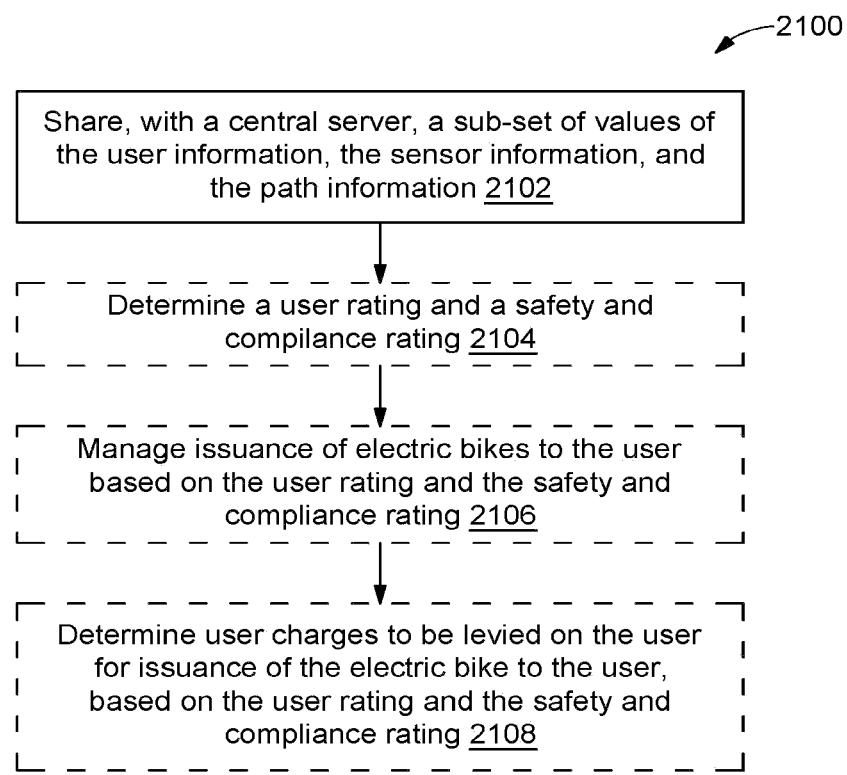
FIG. 21 illustrates a flowchart of a method for sharing user information, path information, and sensor information with a server, in accordance with some embodiments.

With reference to FIG. 21, a flowchart of a method 2100 for sharing user information, path information, and sensor information with a server is illustrated, in accordance with some embodiments. Based on the configuration, one or more of the mobile device or the electric bike may share a sub-set of information states of the user information, the sensor information, and the path information with the server, at step 2102. The sub-set of information states are those that may deviate from the associated predefined thresholds. The server may additionally maintain a record of driving performance of user driving the electric bike, safety and compliance performance of the user, sensor information associated with the electric bike, and the path information associated with the electric bike. Further, the server may determine a user rating based on the record of driving performance and a safety and compliance rating based on the record of the safety and compliance performance, at step 2104. Based on the user rating and the safety and compliance rating, the server may manage issuance of electric bikes to the user, at step 2106. Additionally, based on the user rating and the safety and compliance rating, user charges to be levied on the user for issuance of the electric bike to the user may be determined, at step 2108.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Thus, the disclosed system overcomes the problem of a user having complete control over how an electric bike is used. This is achieved by capturing and processing user information, path information, and sensor information, via an AI based mobile application. Such processing enables avoidance of collision with obstacles present on the path of the electric bike, thereby ensuring safety of the user and that of the people nearby. Moreover, the system is able to determine in real-time whether the user is misusing the electric bike or whether the electric bike has or is going to malfunction because of a mechanical or an electrical issue.

Additionally, the system ensures automatic and strict adherence to compliance rules set in a given state or country. The compliance rules may include traffic rules or custom rules set by a bike renting company. Thus, even if the user is not aware about the existing rules and regulations, these may still be seamlessly adhered to. This is especially useful when a tourist is using the electric bike. The user is also given alerts or warnings in real-time in order to inform him/her of the violations. If the user repeats or causes another violation, various functions of the electric bike are progressively curtailed based on the type of violation. Moreover, such automatic adherence to compliance rules and restrictions applied to various functions of the electric bike ensures that any insurance settlement claims are at minimum. Users with repeated offences can be reported to government authorities along with proof of their repeated violations. The same data may also be readily shared with various electric bike operators, such that, notorious users are discouraged unanimously for safer roads and reduced accidents and/or other untoward incidents.

As will be appreciated by those skilled in the art, the techniques described in the various embodiments discussed above are not routine, or conventional, or well understood in the art. The techniques discussed above may communicatively couple a mobile device to a controller of an electric bike when the mobile device is received by a mobile mount. A front camera of the mobile device may capture user information associated with a user using the electric bike. Sensors configured in the mobile device may capture sensor information associated with the electric bike and the mobile device. A rear camera of the mobile device may capture path information associated with a path being used to ride the electric bike. The technique may use a first mobile application being executed on the mobile device to convert each of the user information, the sensor information, and the path information into corresponding information states. The technique may use the first mobile application to determine whether information states of one of the user information, the sensor information, or the path information are deviating from associated predefined thresholds. The technique may generate, via a display of the mobile device, an alert signal on a GUI when at least one deviation is determined. Further, a deactivating signal may be transmitted to the controller of the electric bike to progressively curtail one of a functioning of the electric bike in response to determining at least one deviation.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An application server for managing electric bikes using Artificial Intelligence (AI), the application server comprising:
    a processor; and
    a memory communicatively coupled to the processor, wherein the memory stores processor instructions that, when executed by the processor cause the processor to:
        process, for each of a plurality of electric bikes, each of:
            user information associated with a user using an electric bike from the plurality of electric bikes, wherein the user information is captured, via a front camera of a mobile device coupled with the electric bike;
            sensor information associated with the electric bike, wherein the sensor information is captured by one or more sensors configured in the mobile device and the electric bike; and path information associated with a path being used to ride the electric bike, wherein the path information is captured, via a rear camera of the mobile device;

convert, for each of the plurality of electric bikes, each of the user information, the sensor information, and the path information into corresponding predefined information states;

determine, for each of the plurality of electric bikes, whether information states of at least one of the user information, the sensor information, or the path information are deviating from associated predefined thresholds;

generate, for at least one electric bike from the plurality of electric bikes, an alert signal in response to determining at least one deviation; and transmit a deactivating signal to the at least one electric bike to progressively curtail at least one functioning of the at least one electric bike in response to determining at least one deviation.

2. The application server of claim 1, wherein the predefined information states and the associated predefined thresholds correspond to numeric values.

3. The application server of claim 1, wherein the processor instructions further cause the processor to determine, for each of the plurality of electric bikes, a sub-set of information states of: the user information, the sensor information, and the path information, wherein the sub-set of information states deviate from the associated predefined thresholds.

4. The application server of claim 2, wherein the processor instructions further cause the processor to maintain a record of at least one of driving performance of the user driving the electric bike, safety and compliance performance of the user, sensor information associated with the electric bike, and the path information associated with the electric bike.

5. The application server of claim 4, wherein the processor instructions further cause the processor to:

determine a user rating based on the record of driving performance; and determine a safety and compliance rating based on the record of the safety and compliance performance.

6. The application server of claim 5, wherein the processor instructions further cause the processor to manage issuance of electric bikes to the user based on the user rating.

7. The application server of claim 5, wherein the processor instructions further cause the processor to determine user charges to be levied on the user for issuance of the electric bike to the user, based on the user rating.

8. The application server of claim 1, wherein the processor instructions further cause the processor to:

store status information related to each of the plurality of bikes, wherein the status information comprises at least one of battery status information, level of charging, distance travelled, top speed while driving, certified range for driving, average speed of the electric bike; and broadcast, to each of the plurality of the electric bike, associated status information.

9. The application server of claim 1, wherein the processor instructions further cause the processor to:

generate a compliance report for a bike operator; and share the compliance report with regulatory authorities.

10. The application server of claim 9, wherein the processor instructions further cause the processor to:

identify users with repeated violations based on the compliance report; and compile proof of repeated violations of the users.

11. The application server of claim 10, wherein the processor instructions further cause the processor to report the users to law enforcement authorities along with the corresponding proof of repeated violations.

12. The application server of claim 1, wherein the processor instructions further cause the processor to:

maintain, for the user, credentials created for the user and access rights granted to the user; and determine access of the user to the electric bike on rent, based on the credentials and the access rights.

* * * * *